(12) United States Patent
Grayson

(10) Patent No.: US 12,127,042 B2
(45) Date of Patent: Oct. 22, 2024

(54) OPEN RADIO ACCESS NETWORK NEUTRAL HOST

(71) Applicant: Cisco Technology, Inc., San Jose, CA (US)

(72) Inventor: Mark Grayson, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 17/532,410

(22) Filed: Nov. 22, 2021

(65) Prior Publication Data

US 2022/0400412 A1 Dec. 15, 2022

Related U.S. Application Data

(60) Provisional application No. 63/210,259, filed on Jun. 14, 2021.

(51) Int. Cl.
*H04W 28/16* (2009.01)
*H04B 1/00* (2006.01)
*H04W 80/08* (2009.01)

(52) U.S. Cl.
CPC .......... *H04W 28/16* (2013.01); *H04B 1/0003* (2013.01); *H04W 80/08* (2013.01)

(58) Field of Classification Search
CPC ..... H04W 24/02; H04W 88/18; H04W 16/14; H04W 28/16; H04B 1/0003; G06F 9/5077; H04L 41/0853; H04L 41/0895; H04L 41/0806; H04L 41/0866; H04M 15/49; H04M 15/04
See application file for complete search history.

(56) References Cited

U.S. PATENT DOCUMENTS

2013/0303114 A1* 11/2013 Ahmad ............... H04L 12/1407
455/406
2017/0264592 A1* 9/2017 Yoda ................... H04L 63/1441
(Continued)

FOREIGN PATENT DOCUMENTS

WO 2021156745 8/2021

OTHER PUBLICATIONS

Wu et al., "A Framework for Automating Service and Network Management with YANG", Jan. 2021, https://datatracker.ietf.org/doc/html/rfc8969#name-schema-mount (Year: 2021).*

(Continued)

*Primary Examiner* — Quoc Thai N Vu
(74) *Attorney, Agent, or Firm* — Polsinelli P.C.

(57) ABSTRACT

System, methods, and computer-readable media for validating and committing a shared O-RU configuration via a shared O-RU Operator. The shared O-RU Operator validates a partitioned configuration received from a tenant operator, with the ability to indicate to the tenant operator that the partitioned configuration is conformant to agreed-upon sharing rules and then commits the shared configuration to the shared O-RU. The shared O-RU operator shares the outcome of the commit operation to the tenant operator via defined operational-data that can be read by the tenant operator. A single radio in O-RAN is shared by multiple different operators and enables a neutral host to deploy a radio unit and then have that attached to different operators networks.

19 Claims, 19 Drawing Sheets

(56) References Cited

U.S. PATENT DOCUMENTS

2018/0184331 A1    6/2018  Samdanis et al.
2021/0176646 A1*   6/2021  Pabla ................... H04W 16/14
2022/0337479 A1*  10/2022  Zheng ................. H04L 41/0806

OTHER PUBLICATIONS

"Multi-Tenant and Sharing (MORAN and MOCN), " https://www.parallelwireless.com/, Parallel Wireless, Sep. 28, 2021, pp. 1-12.
"Neutral Host Solutions for 5G Multi-Operator Deployments in Managed Spaces," https://www.atis.org/, Atis, 2019, pp. 1-49.
"Universal Mobile Telecommunications System (UMTS); LTE; Network Sharing; Architecture and Functional Description (3GPP TS 23.251 VERSION 16.0.0 RELEASE 16)," https://www.etsi.org/, 3GPP ETSI, Jul. 2020, pp. 1-41.

\* cited by examiner

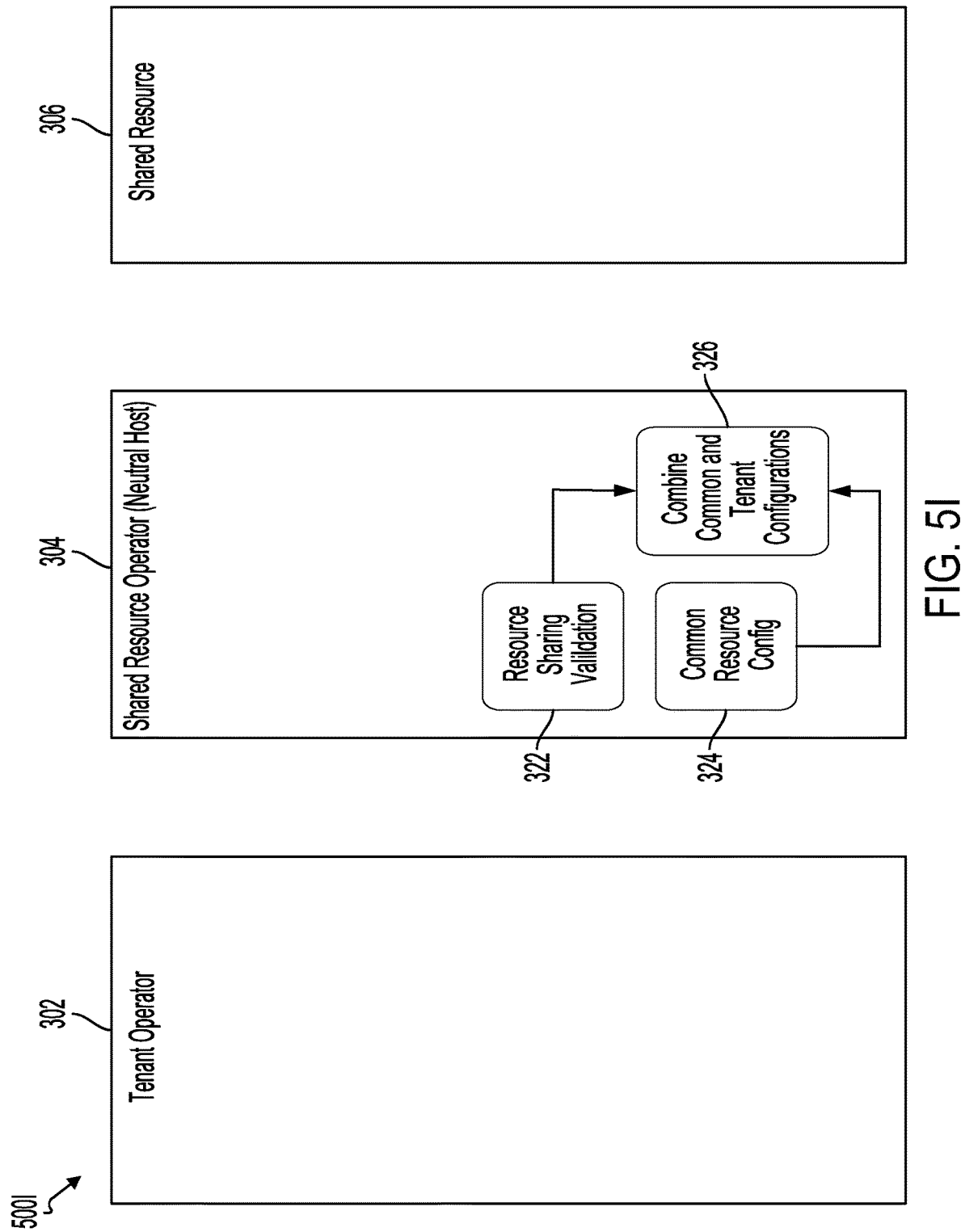

OPEN RADIO ACCESS NETWORK NEUTRAL HOST

CROSS-REFERENCE TO RELATED APPLICATIONS

This application claims priority to U.S. Provisional Patent Application No. 63/210,259, filed on Jun. 14, 2021, the content of which is incorporated herein by reference in its entirety.

TECHNICAL FIELD

The present disclosure generally relates to operating a shared Open Radio Access Network (O-RAN) Radio Unit (O-RU), and more specifically, to validate a partitioned configuration received from a tenant operator.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Advances in SDR (software-defined radio) have enabled an O-RU (O-RAN radio unit) to be shared between different tenant operators via additional SDR systems and methods to be defined for effective sharing. O-RAN is focused on decomposing the RAN into multiple different functions and elements and then defining one or more multivendor interfaces between such functions and elements. As such, in O-RAN, there can be a distributed unit associated with a first vendor that interfaces with a radio unit associated with a second vendor, as an example.

However, O-RAN has generally been conceived as operating in a single operator domain, meaning that multiple different operators do not share a single radio.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIGS. 5A-K illustrate other various example operations that may be utilized for implementing an O-RAN neutral host utilizing techniques, in accordance with some aspects of the present technology;

DETAILED DESCRIPTION

Figure 1A:
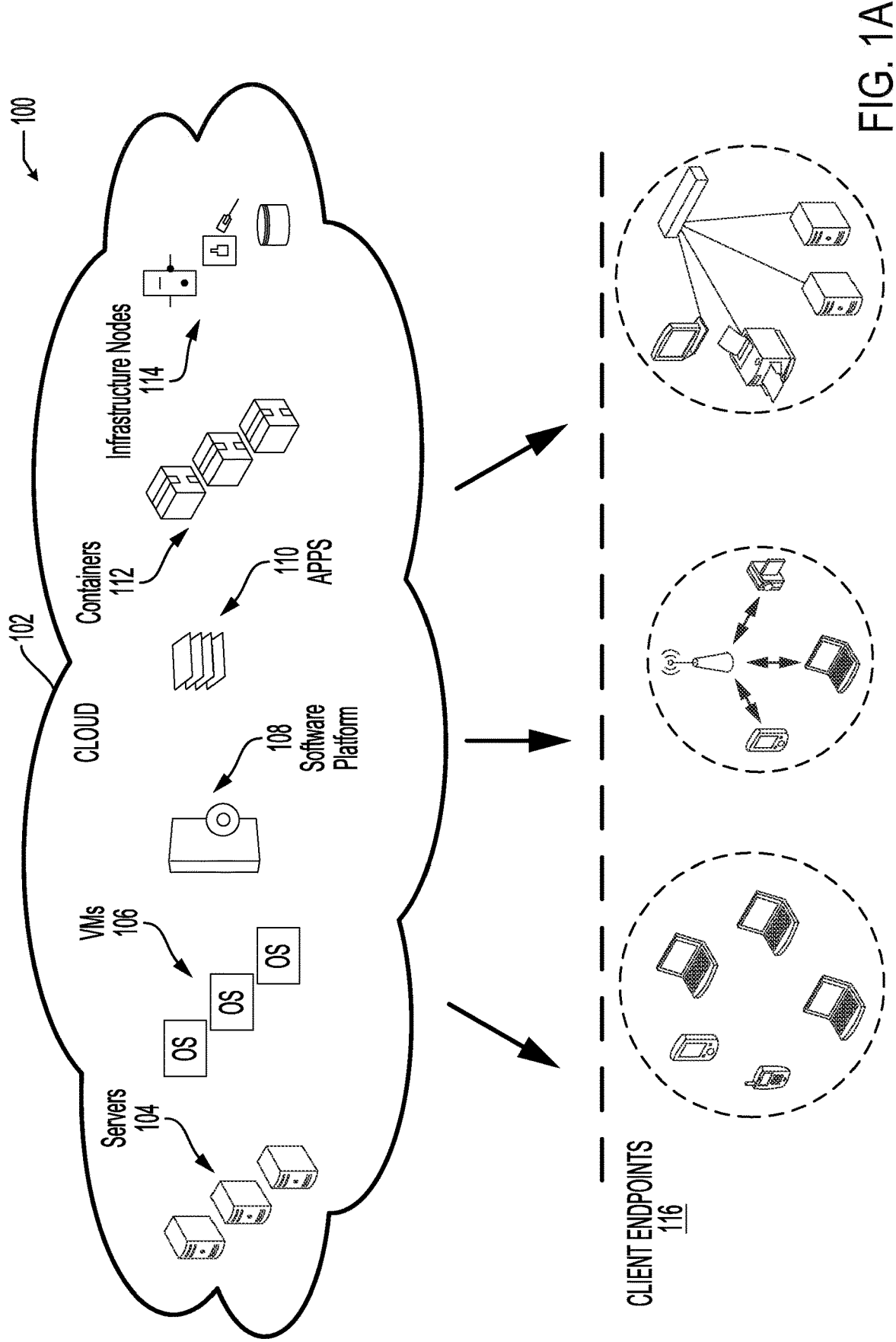
FIG. 1A illustrates an example cloud computing architecture in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

OVERVIEW

Disclosed are systems, apparatuses, methods, non-transitory computer-readable media, and circuits for validating and committing a shared O-RU configuration via a shared O-RU Operator. According to at least one example, a method may include receiving a first partitioning configuration from a first tenant by a shared Open Radio Access Network (O-RAN) resource operator.

In some examples, the method may include confirming that the first partitioning configuration from the first tenant is conformant to a first out of band agreement by the shared O-RAN resource operator. In some embodiments, the method may further include committing the first partitioning configuration from the first tenant to a shared O-RAN resource configured by the shared O-RAN resource operator.

A system can include one or more processors and at least one computer-readable storage medium storing instructions which, when executed by the one or more processors, cause the one or more processors to receive, by a shared Open Radio Access Network (O-RAN) resource operator, a first partitioning configuration from a first tenant.

The instructions may further cause the one or more processors to confirm that the first partitioning configuration from the first tenant is conformant to a first out of band agreement by the shared O-RAN resource operator after the confirming that the first partitioning configuration is conformant. The instructions may further cause the one or more processors to commit the first partitioning configuration from the first tenant to a shared O-RAN resource configured by the shared O-RAN resource operator.

A non-transitory computer-readable storage medium having stored therein instructions which, when executed by a computing system, cause the computing system to receive, by a shared Open Radio Access Network (O-RAN) resource operator, a first partitioning configuration from a first tenant.

The instructions may further cause the computing system to confirm, by the shared O-RAN resource operator, that the first partitioning configuration from the first tenant is conformant to a first out of band agreement. The instructions may further cause the computing system to commit the first partitioning configuration from the first tenant to a shared O-RAN resource configured by the shared O-RAN resource operator.

DESCRIPTION OF EXAMPLE EMBODIMENTS

As noted above, fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

In O-RAN, there is a need to deploy a shared system for a couple of use cases. One is a rural economic case, wherein it does not make economic sense for a single operator to deploy their systems independently given the insufficient traffic users, such that they would not get a return on their investment. Therefore, it would be beneficial to install one radio unit, which can then be shared by multiple operators. A second use case is a more conventional shared market, in an indoor market for large properties such as a shopping mall or sports stadium of upward of 250,000 square feet, where distributed antenna systems and sometimes base stations as well, in the basement, for example, are set up in a distributed system. There is a common need to deploy a single radio that can be shared between multiple different operators in both extremes.

The disclosed technology addresses the need in the art for O-RAN to allow a single radio to be shared by multiple different operators and also to enable a neutral host to deploy a radio unit and then have that attached to different operators' networks. The present technology involves system, methods, and computer-readable media for validating and committing a shared O-RU configuration via a shared O-RU Operator. As such, the shared O-RU Operator may be able to (1) validate a partitioned configuration received from a tenant operator, with the ability to indicate to the tenant operator that the partitioned configuration is conformant to agreed-upon sharing rules and then (2) commit the shared configuration to the shared O-RU, whereby the shared O-RU operator is able to share the outcome of the commit operation to the tenant operator via defined operational-data that the tenant operator can read.

Figure 1B:
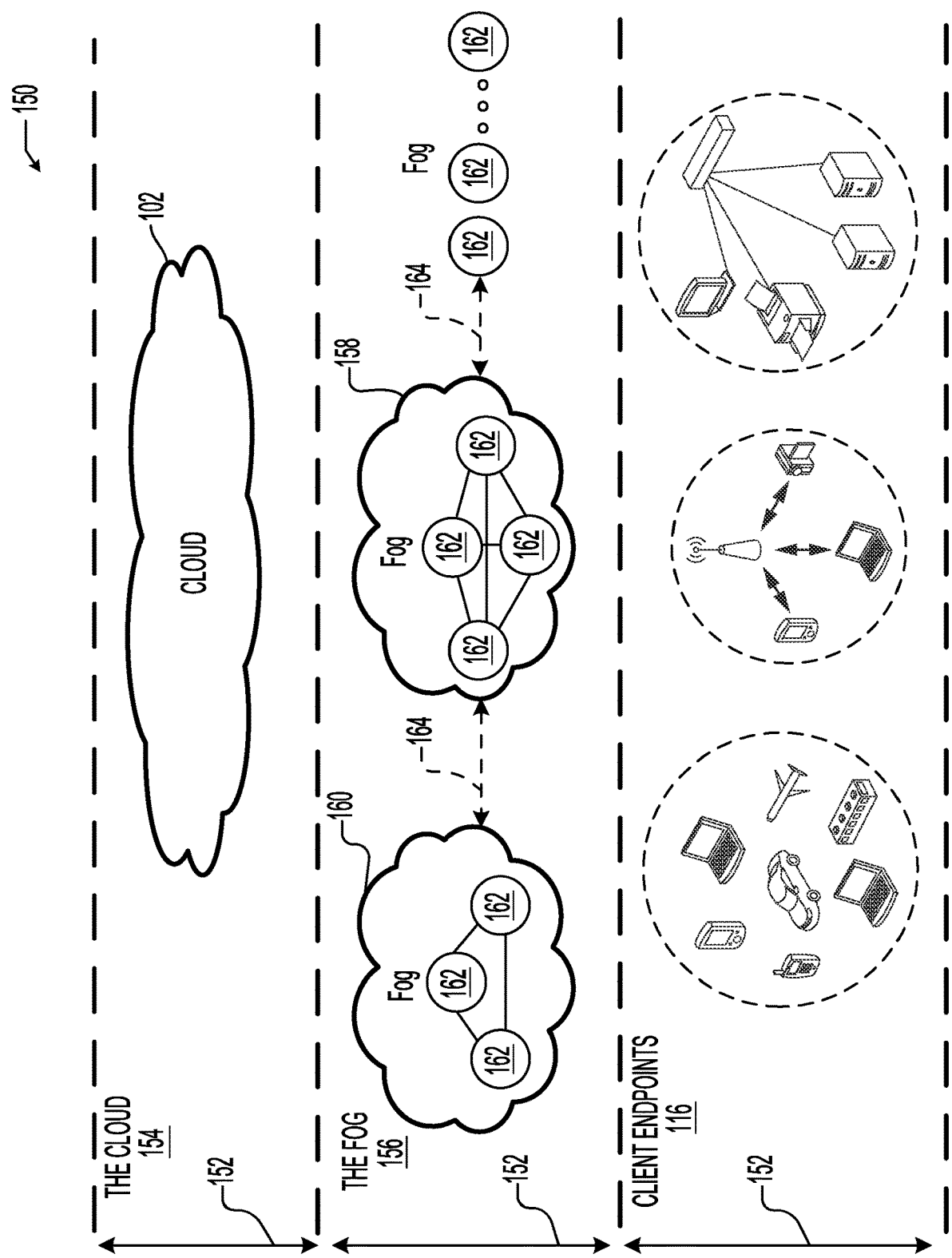
FIG. 1B illustrates an example fog computing architecture in accordance with some aspects of the present technology.
Figure 2:
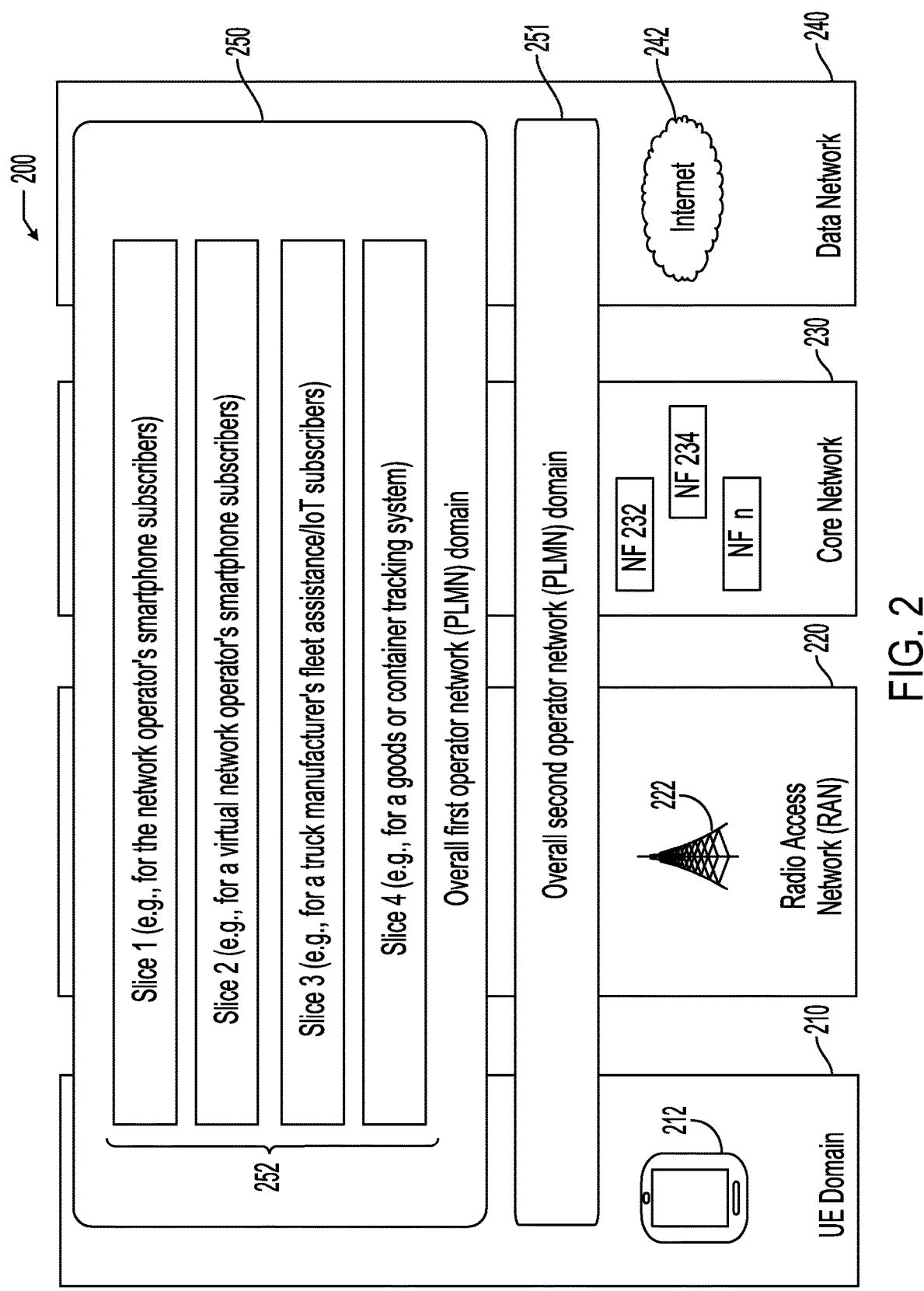
FIG. 2 depicts an example schematic representation of a 5G network environment in which network slicing has been implemented in accordance with some aspects of the present technology.

A description of network environments and architectures for network data access and services, as illustrated in FIGS. 1A, 1B, and 2 is first disclosed herein. A discussion of systems, methods, and computer-readable media for validating and committing a shared O-RU configuration via a shared O-RU Operator, as shown in FIGS. 3-6, will then follow. The discussion then concludes with a brief description of an example device, as illustrated in FIG. 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can form part of a IP connection or otherwise be accessed through the IP connection. Specifically, the cloud 102 can include an initiator or a receiver of an IP connection and be utilized by the initiator or the receiver to transmit and/or receive data through the IP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of an IP connection or otherwise be accessed through the IP connection. Specifically, the fog computing architecture can include an initiator or a receiver of an IP connection and be utilized by the initiator or the receiver to transmit and/or receive data through the IP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage, and networking capabilities of traditional cloud networks but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh, or hierarchical arrangements, for example.

In some cases, one or more fog nodes 162 can be mobile fog nodes. The mobile fog nodes can move to different geographic locations, logical locations, or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an example schematic representation of a 5G network environment 200 in which network slicing has been implemented and in which one or more aspects of the present technology may operate. As illustrated, network environment 200 is divided into four domains, each of which will be explained in greater depth below; a User Equipment (UE) domain 210, e.g., of one or more enterprises, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g., to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments, an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present technology, as would be appreciated by one of ordinary skill in the art.

Across these four domains of the 5G network environment 200, one or more overall operator network domains 250, 251 are defined. The operator network domain 250 is in some embodiments a Public Land Mobile Network (PLMN) and can be thought of as the carrier or business entity that provides cellular service to the end users in UE domain 210. In other embodiments the operator domain 250 is a private Non-Public Network (NPN). Within the operator network domain 250, a plurality of network slices 252 are created, defined, or otherwise provisioned in order to deliver the desired set of defined features and functionalities, e.g., SaaSs, for a certain use case or corresponding to other requirements or specifications. Note that network slicing for the plurality of network slices 252 is implemented in an end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present technology, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits the controlled decomposition of a PLMN with the specific network functions and provides services that are required for a specific usage scenario. In other embodiments, network slicing may enable a 5G network operator to deploy multiple, independent PLMNs where each is customized by instantiating only those features, capabilities, and services required to satisfy a given subset of the UEs or a related business customer needs. In some embodiments, the plurality of independent PLMNs may correspond to a mix of public and non-public networks.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g., based on requirements of the services, to the enterprise. In other embodiments, the enterprise may request a host operator to instantiate a particular Non-Public Network on behalf of the enterprise. At the time of registration, the enterprise may provide a set of networking identities including ITU-T E.212 network codes to be used in its NPN.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g., 5G service providers, and SaaS providers.

Figure 3:
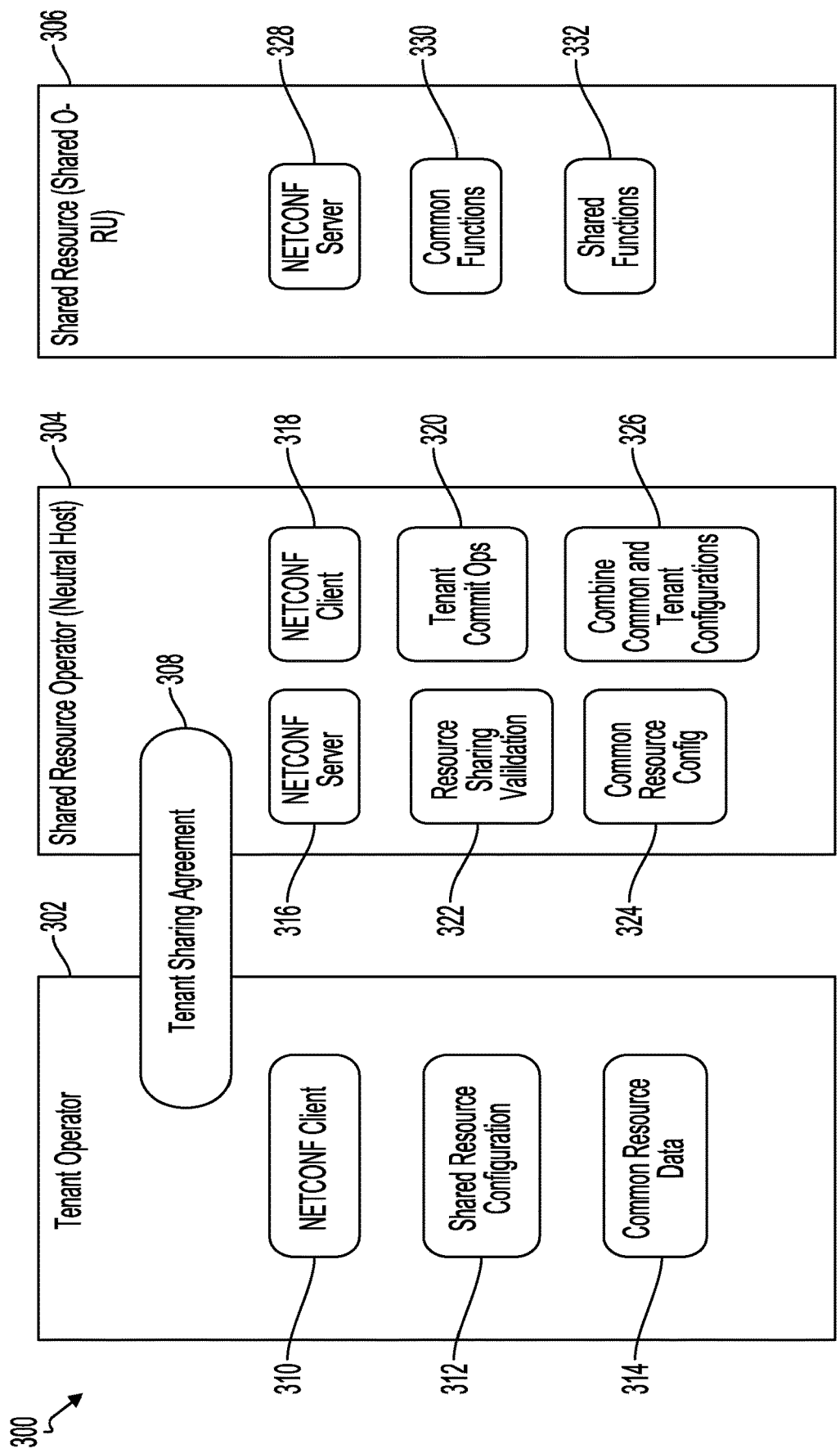
FIG. 3 illustrates an example schematic representation of tenant management of a shared O-RU via a O-RU Provider Management Module in accordance with some aspects of the present technology.

FIG. 3 illustrates a diagram of a system in which techniques may be implemented to provide an Open Radio Access Network (O-RAN) neutral host, according to an example of the instant disclosure.

The system 300 provide for the ability to validate, on a per-tenant basis, that a shared resource configuration (e.g., a shared O-RU configuration) of a particular tenant adheres to various sharing/partitioning rules and then subsequently pushes the shared resource configuration to a shared resource 306 (e.g., a shared O-RU). The system 300 may include a tenant operator 302, a shared resource operator 304, also referred to herein interchangeably as a neutral host operator, and a shared O-RU.

In at least one embodiment, the shared resource operator 304 may be implemented as a shared O-RU operator 304, and the shared O-RU 306 may be implemented as a shared O-RU. Generally, the shared resource operator 304 has a management role (e.g., similar to a System or Service Management and Orchestration (SMO) entity) to operate the shared O-RU 306. The tenant operator 302 may be implemented as an O-DU/O-CU operator in at least one embodiment. Generally, the tenant operator 302 implements their own O-CU and O-DU and connects it to the shared O-RU.

The tenant operator 302 may include a NETCONF client 310, a shared resource configuration (config) information 312, and common resource data 314. The shared resource operator 304 may include a NETCONF server 316, a NETCONF client 318, tenant commit operational logic (Ops) 320, resource sharing validation logic 322, common resource configuration information 324, and combine common and tenant configuration functionality/information 326. The shared O-RU 306 may include a NETCONF server 328, various common functions/logic 330, and various shared functions/logic 332. A tenant sharing agreement 308 can be negotiated between the shared resource operator 304 and the tenant operator 302, as discussed in further detail herein.

In general, the NETCONF server 316, 328 is a policy control point in a managed device that terminates the NETCONF protocol and manages interactions with the device's configuration management information or datastore that can be maintained at the device. In some instances, a NETCONF server 316, 328 can implement Access Control based on a NETCONF Access Control Model (NACM) as prescribed at least by Internet Engineering Task Force (IETF) Request For Comments (RFC) 6536, 8341, etc., to define privileges to the configuration information/datastore (e.g., read access, write access, etc.). In general, the NETCONF client 310, 318 is a network management function that terminates the NETCONF protocol and interacts with a NETCONF server 316, 328 to get or edit the contents of the managed device's configuration information/datastore.

Enhanced operations may be facilitated by the system of FIG. 3 to support the current framework for an O-RAN neutral host or shared resource operator 304. In particular, techniques herein may provide a two-step approach to the configuration of a shared resource (not currently addressed in the current O-RAN architecture), whereby, in accordance with techniques presented herein, a given tenant's configuration (e.g., the tenant operator, as shown in FIG. 3) is first validated by the shared resource operator 304 and then subsequently committed to the shared resource (shared O-RU) 306. Techniques herein also facilitate the operation of a schema mount in which the container comprising the mounted schema can be enhanced with the ability to indicate the status of an aggregated shared resource (shared O-RU) configuration as it relates to whether the given tenant's configuration has been successfully committed to the shared resource (shared O-RU) 306, which may avoid any validation logic from residing in the shared resource.

The operator of the shared O-RU could be a neutral host or an operator that is also a carrier and offers this service to others. The O-RU operator has specific requirements in terms of how it partitions the resources of the O-RU, which has a lot of resources. There are also lots of parameters pertaining to how the O-RU could be configured. Therefore, the question is how the O-RU operator agrees to a partitioning of the O-RU between a first and second operator. For example, partitioning may deal with aspects like spectrum. Therefore, operators may bring their own O-DU, and the O-RU operator may partition a set of carriers to work in a set spectrum that the operator agrees to radiant in that spectrum while operating the O-RU.

Power also needs to be partitioned and could be negotiated out of band. For example, the O-RU operator offered 25% of all transmit power capabilities on a common radio node to four different operators. However, the issue is that the O-RU operator needs to be able to validate that each of the operators is adhering to their agreement. The configuration of the O-RU does not limit the operators to emit only 25% of the power, therefore there needs to be systems and processes set in place to allow a neutral host to validate that the agreements are being complied with.

O-RAN Alliance Working Group 5 (WG5) has defined a schema mount process for aggregating Working Group 4 (WG4) O-RU YANG models, which provides for the ability to enable the configuration of each O-RU for an O-RAN deployment to be reported by an ORAN Distributed Unit (O-DU) to a System or Service Management and Orchestration (SMO) entity. Generally, an O-RU may implement any combination of a cellular and/or wireless air interface for any combination of Radio Access Technology (RAT) types (sometimes referred to more generally as 'accesses') such as but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizens Broadband Radio Service (CBRS) accesses; combinations thereof; and/or the like.

Thus, an O-RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as beamforming) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., Wi-4G/LTE, 5G, nG, CBRS, etc.) through which one or more user equipment may utilize to connect to an O-RU for one or more sessions (e.g., voice, video, data, gaming, combinations thereof, etc.). In current implementations, an O-RU interfaces with a single O-DU.

Generally, an O-DU (also sometimes referred to as a baseband unit) may provide lower level operations of the radio signal processing stack, such as Radio Link Control (RLC), Medium Access Control (MAC), and upper physical (PHY) layer operations, such as digital processing, including signal modulation, encoding, and scheduling, among others. The O-DU interfaces with an O-RAN Central or Centralized Unit (O-CU), which can further interface with a mobile core network, which may be configured as any combination of a 4G/LTE core, typically referred to as the Evolved Packet Core or System (EPC/EPS), a 5G core or system (5GC/5GS), a next Generation core or system (nG), and/or the like. The O-CU may provide upper level operations of a radio signal processing stack, such as Packet Data Convergence Protocol (PDCP) functions and radio resource control, among others. The split of operations of a radio signal processing stack between an O-DU and O-CU can be varied depending on the implementation and/or configuration of a given O-RAN/network architecture.

As prescribed by the O-RAN Alliance WG4 Specification 'O-RAN.WG4.MP.0-v04.00', a 'processing element endpoint' can be configured on an O-RU based on the O-DU to which it is assigned or 'homed' in which the processing element endpoint includes transport-based identifiers that define local and remote endpoints that are to be used for specific data flows between a given O-RU and the O-DU to which the O-RU is assigned. Stated differently, a processing element endpoint is the O-RAN construct used to configure flows (that can be used for data flow transport, measurement operations, etc.) on the fronthaul interface between each O-RU and the O-DU with which each O-RU is assigned.

In various embodiments, a processing element endpoint configuration, depending on the transport type/network connectivity (e.g., Ethernet, IP, etc.) between each 0-DU/O-RU, may identify any of: different (alias) Media Access Control (MAC) addresses, virtual local area network (VLAN) identity, and MAC addresses; and/or User Datagram Protocol (UDP) ports and Internet Protocol (IP) addresses for the O-DU to which each O-RU is assigned. A particular processing element endpoint definition configured for a given O-RU/O-DU assignment can be provided a 'name' or other identifier that can be used by other systems, nodes, etc., to tie certain flows to O-DUs.

Figure 4A:
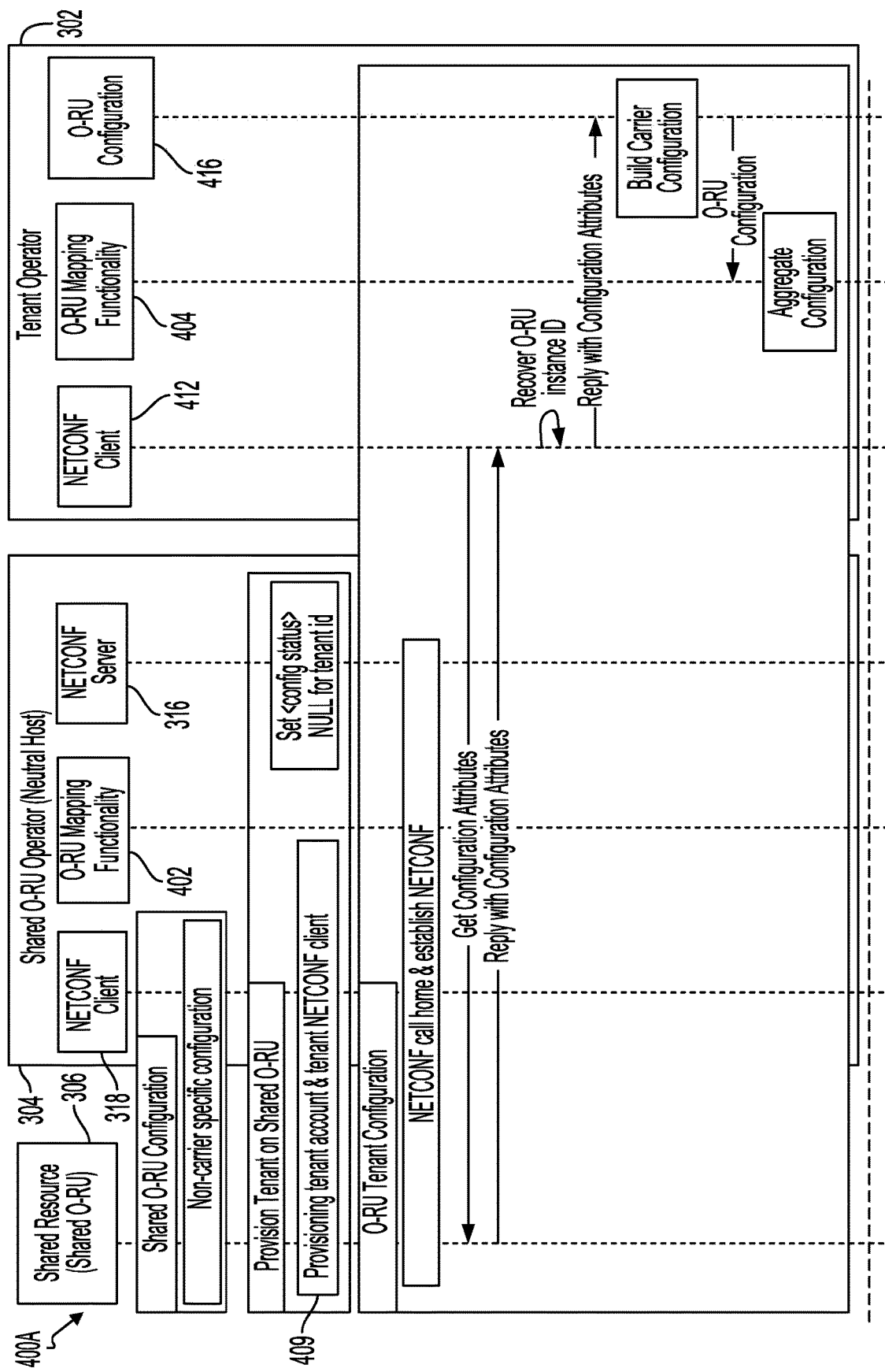
FIGS. 4A and 4B illustrate an example flow diagram of validating and committing a shared O-RU configuration via a shared O-RU Operator, in accordance with some aspects of the present technology.
Figure 4B:
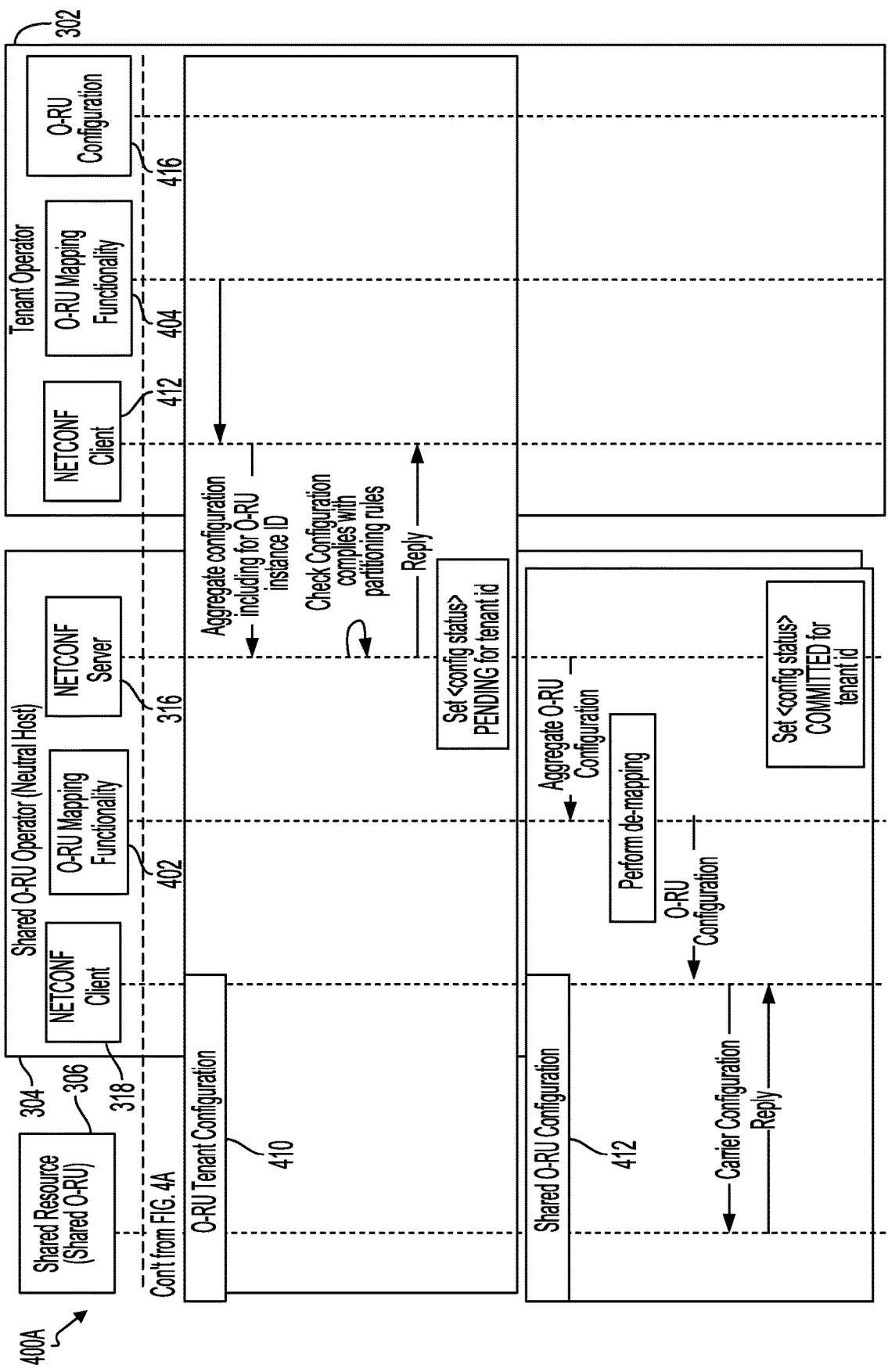

FIGS. 4A-4B illustrates an example call flow diagram of validating and committing a shared O-RU configuration via a shared O-RU Operator, according to an example of the instant disclosure.

The operations illustrated for FIGS. 4A-4B allows the shared O-RU operator 304 to validate that the configured schema adheres to the shared O-RU operator's sharing rules and then subsequently pushes and commits the configuration to the shared O-RU 306. This may help to avoid having to synchronously push the configuration to a shared O-RU 306 that may not be possible, e.g., because a NETCONF session isn't currently active to the shared O-RU. For FIGS. 4A-4B, the combined common and tenant configuration functionality/information may generally be represented as a O-RU mapping functionality 402, 404.

As shown for FIGS. 4A-4B, the shared O-RU operator 304 can validate that a carrier configuration received from the tenant operator 302 conforms to the partitioning rules for the shared O-RU resources. Various NETCONF access control write privileges, discussed in further detail below, can be used to restrict a tenant from directly configuring those aspects of the shared O-RU 306 that involve validation by the shared O-RU operator 304. Instead, the shared O-RU operator 304 is responsible for validating that the configuration of the shared O-RU 306 conforms with the partitioning of shared O-RU resources, as agreed to between the shared O-RU operator 304 and the tenant operator 302 of the shared O-RU 306. The shared O-RU 306 is not aware of any such partitioning rules. The validation can be performed using a "pass through" configuration approach, as illustrated in FIGS. 4A-4B.

If a configuration attempted by the tenant operator contravenes the partitioning rules, the shared O-RU operator 304 can reject the configuration by the tenant operator 302, with an "access-denied" error. An error information element can be used to provide more information regarding the partitioning rules that are to be observed.

An <ok/> rpc-reply to an <edit-config> of schemas mounted using the o-ran-wg4-aggregated YANG model indicates that the configuration has been validated as conformant by the shared O-RU operator 304 but does not indicate that the same configuration has been committed to the corresponding shared O-RU 306. Rather, the reply means that the committed configuration from a tenant operator 302 only reflects committed changes to the aggregated shared O-RU configuration database operated by the shared O-RU operator 304.

O-RAN defines the use of NETCONF from the YANG model for configuration and various procedures about how sessions are established between the O-RU and other systems. The start-up procedures are standardized that the O-RU will get an IP address using DHCP and will use some options in DHCP to understand the NETCONF client IP address, whereby a session with the NETCONF client is established. In one embodiment, the O-RU will recover the address of the NETCONF client 318 of the shared operator 304. The shared O-RU operator, the host, may then provision various common aspects of the O-RU, since there are aspects of the O-RU that aren't specific to a particular tenant. For example, IP addresses, VLANs, how many ports are available, local timezone, etc.

The O-RU operator may also provision new accounts on the NETCONF server that sits in the O-RU, whereby the NETCONF client can configure new accounts on that NETCONF server 328. The O-RU operator may further configure IP addresses of new NETCONF clients that are not just discovered. For example, a first NETCONF client may be discovered using DHCP, and then a NETCONF session may be bootstrapped to provision another NETCONF client 310. Then, the O-RU attempts to call home to the other NETCONF client corresponding to the tenant, since there is configuration data presented. The configurations include the out of band agreements and facets of the configuration, such as IP addresses, etc. Then, the tenant has a NETCONF session and can recover information from the O-RU and thus can configure the O-RU.

The NETCONF interfaces implement a NETCONF Access Control Model (NACM), which is a form of role-based access control (RBAC). So different clients can have different privileges. O-RAN can utilize NACM to distinguish different privileges, e.g., a super user privilege that has access to every part of the configuration or a O-DU privilege that has privileges for carrier configuration. The O-RAN, in this case, can take advantage of the NACM by not only associating the NETCONF session with a particular set of reduced privileges to constrain what the tenant can do but also associating his privileges with a tenant ID associated with an account. For example, if there are two tenants attached to an O-RU, a first tenant should not be able to see the performance counters associated with the carriers of a second tenant sharing the O-RU or be able to configure the O-RU operated by the second tenant. Therefore, the tenant IDs are used to build additional types of privileges that can be associated with particular rules as part of the configuration schema of the O-RU. More specifically, a YANG model is defined in accordance with embodiments herein that that includes a "tenant-status" list, which, based on a per-shared resource instance identifier (ID) (e.g., per 'ru-instance-id', as shown below, for each of one or more O-RU instances) and tenant ID (e.g., 'tenant-id', as shown below) basis, is able to indicate whether a shared resource configuration configured by a given tenant on the shared resource operator's centralized systems has been committed to the shared O-RU 306 that corresponds to the shared resource instance ID (e.g., that corresponds to the ru-instance-id).

Consider an example YANG data model that may be utilized in accordance with embodiments herein, as shown in TABLE 1, below, to facilitate various operations via the shared resource operator of FIG. 1.

TABLE 1

EXAMPLE YANG DATA MODEL list aggregated-configuration {
key ru-instance-id;
description
"a list used to aggregate the configuration and operational state of multiple shared O-RUs.";
leaf ru-instance-id {
type leafref {
path "/aggregated-o-ru/aggregated-o-rus/ru-instance-id";
require-instance false;
}
Description
"an O-RU instance IDs that has been recovered by the operator of the NETCONF server, e.g., by the operator have a separate NETCONF session with a O-RU using the O-RAN WG4 fronthaul defined NETCONF/YANG interface";
}
list tenant-status {
key tenant-id;
config false;
description
"a list used to store the config status for a particular tenant";
leaf tenant-id {
type uint8;
description
"A tenant identity";
}
leaf config-status {
type enumeration {
enum NULL {
description
"No configuration has been received";
}
enum PENDING {
description
"The mounted schemas have not yet been committed to the O-RU instance";
}
enum COMMITTED! 
description
"The mounted schemas have been committed to the O-RU instance";
}
enum FAILED {
description
"The NETCONF server operator failed to configure the mounted schemas on the O-RU instance";
}
}
description
"indicates if the NETCONF server operator has successfully committed the configuration of an individual O-RU instance";
}

TABLE 1-continued

EXAMPLE YANG DATA MODEL

```
leaf reply-error {
type string;
config false;
description
"if the NETCONF server operator fails to configure an individual
O-RU instance, provides some reason why the operation failed";
}
}
yangmnt:mount-point "root" {
description
"Root mount point for the models of an individual O-RU";
}
}
```

A second operational stage, as shown in FIGS. 4A-4B can be used to confirm the committed configuration from the tenant operator 302 has been committed to the shared O-RU 306. To enable such a two-step approach, a separate config-status schema-node can be used by the shared O-RU operator 304 to indicate to the tenant operator 302 when the aggregated configuration has been committed to an individual O-RU 306.

A shared O-RU 306 for a given deployment may support the notification of updates to its configuration datastore functionality. Hence, any tenant operator may configure subscriptions to receive notifications of modifications to a shared O-RU's datastore, according to the defined NETCONF access control privileges for the tenant operator 302.

In addition, the NETCONF server 316 of the shared O-RU operator 304 may support the notification of updates to its configuration datastore functionality. Hence, any tenant operator may configure subscriptions to receive notifications of modifications to the tenant-status list, thereby enabling a given tenant to be signaled when the aggregated carrier configuration status has changed from PENDING to COMMITTED for a specific ru-instance-id.

Generally during operation of the system of FIG. 3, the shared O-RU operator 304 can trigger the shared O-RU 306 to establish a NETCONF session with the NETCONF client of the shared O-RU operator 304. The shared O-RU operator 304 can use the o-ran-mplane-int YANG model and, more specifically, the configured-client-info container to configure the shared O-RU 306 with NETCONF client information corresponding to the individual tenants of the shared O-RU 306.

FIGS. 5A-K illustrate other various example operations that may be utilized for implementing an O-RAN neutral host 304 utilizing techniques as discussed herein, according to an example of the instant disclosure.

Figure 5A:
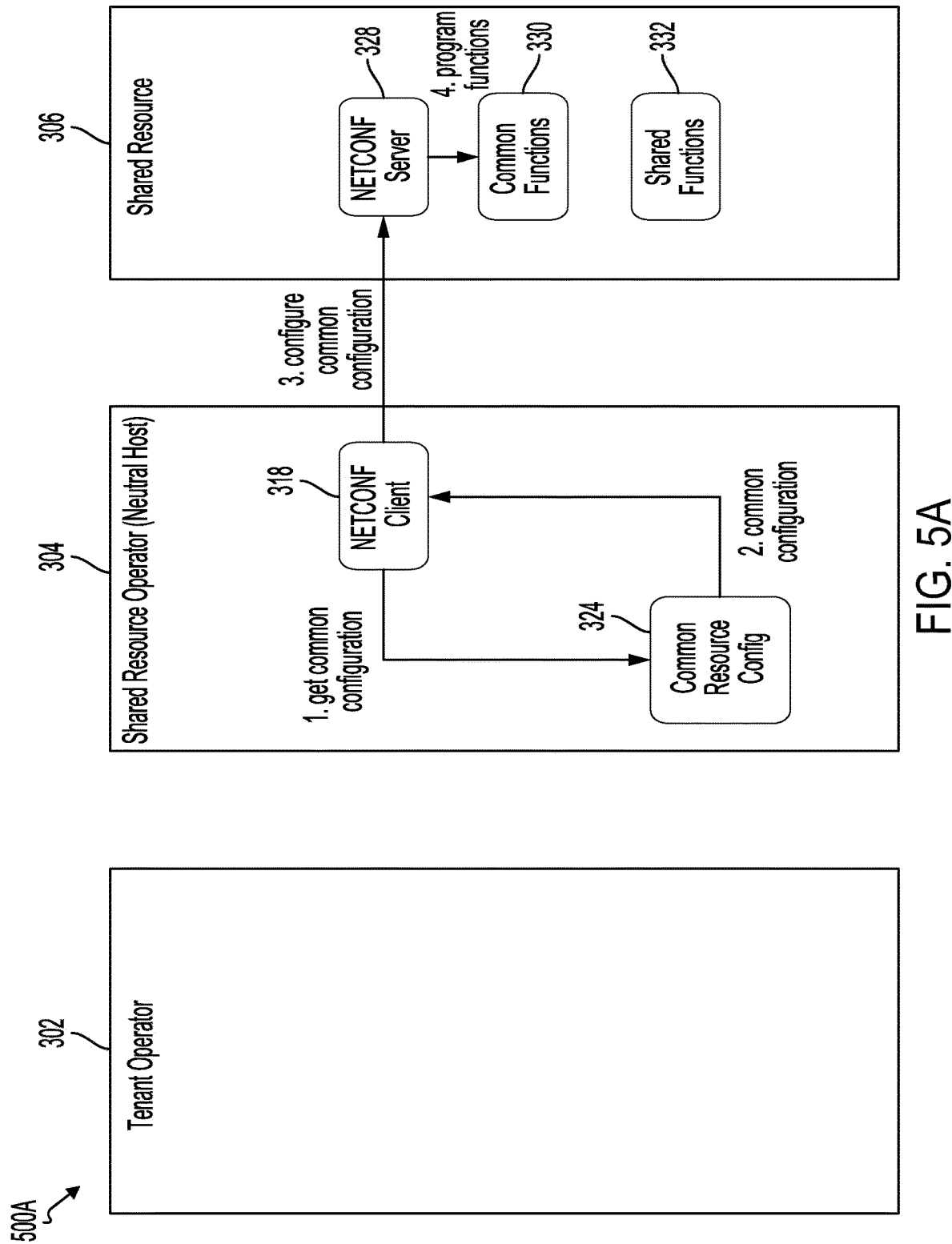

As shown in FIG. 5A for a first step (Step 1), the shared O-RU operator 304 (shown as a shared resource operator) can deploy a new shared O-RU 306 (shown as a shared resource). For FIGS. 5A-5K, the terms 'shared resource' and 'shared O-RU' are used interchangeably. The deployment procedure includes the shared O-RU operator 304 configuring common functionality on the shared O-RU 306, wherein the common functionality represents those aspects of the shared O-RU 306 which do not have to be customized on a per-tenant operator basis.

Figure 5B:
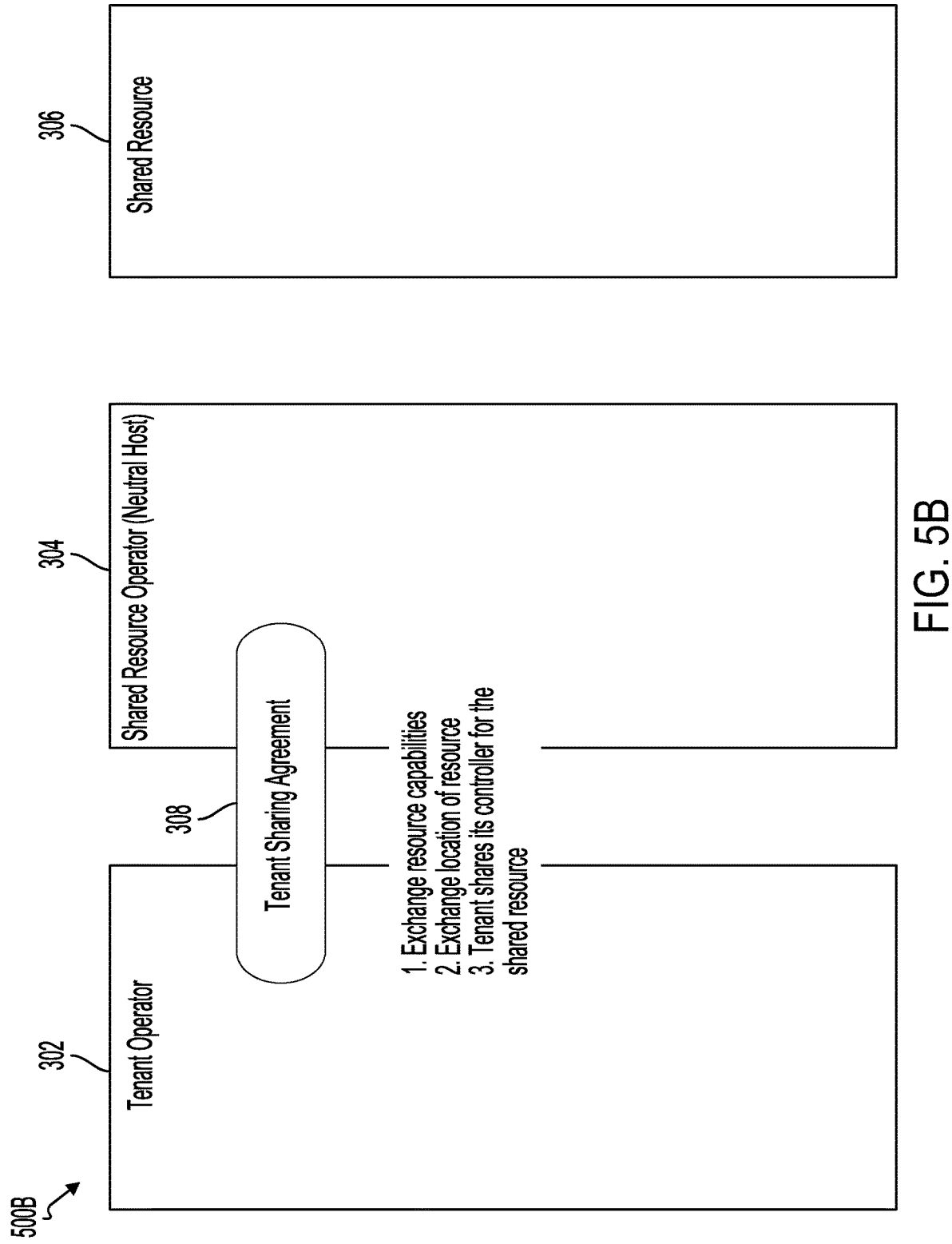

As shown in FIG. 5B for a second step (Step 2), a tenant sharing agreement 308 can be negotiated/established between the shared resource operator 304 and the tenant operator 302 through which the shared resource operator 304 exchanges resource capability information and location information regarding the shared O-RU 306 and the tenant operator 302 shares its controller for the shared O-RU 306. Thus, the shared resource operator 304 agrees with the tenant access to the shared O-RU 306.

Next, the shared resource operator 304 can provision user accounts on the NETCONF server 328 of the shared O-RU 306 for each tenant operator 302 of the shared O-RU 306. The shared O-RU operator 304 of the shared O-RU 306 can configure the user account associated with a given tenant to be associated unique tenant ID (tenant-id) for the given tenant. The shared O-RU operator 304 may ensure that any user account associated with an independent tenant is associated only with the "tenant-odu" access control group, which is used to control the privileges of the user account to access the configuration and operational information of the shared O-RU. Following the user account provisioning, the shared O-RU 306 is triggered to perform additional call home procedures to any configured clients, which, in this scenario, will be the NETCONF clients corresponding to individual tenant operators.

Figure 5C:
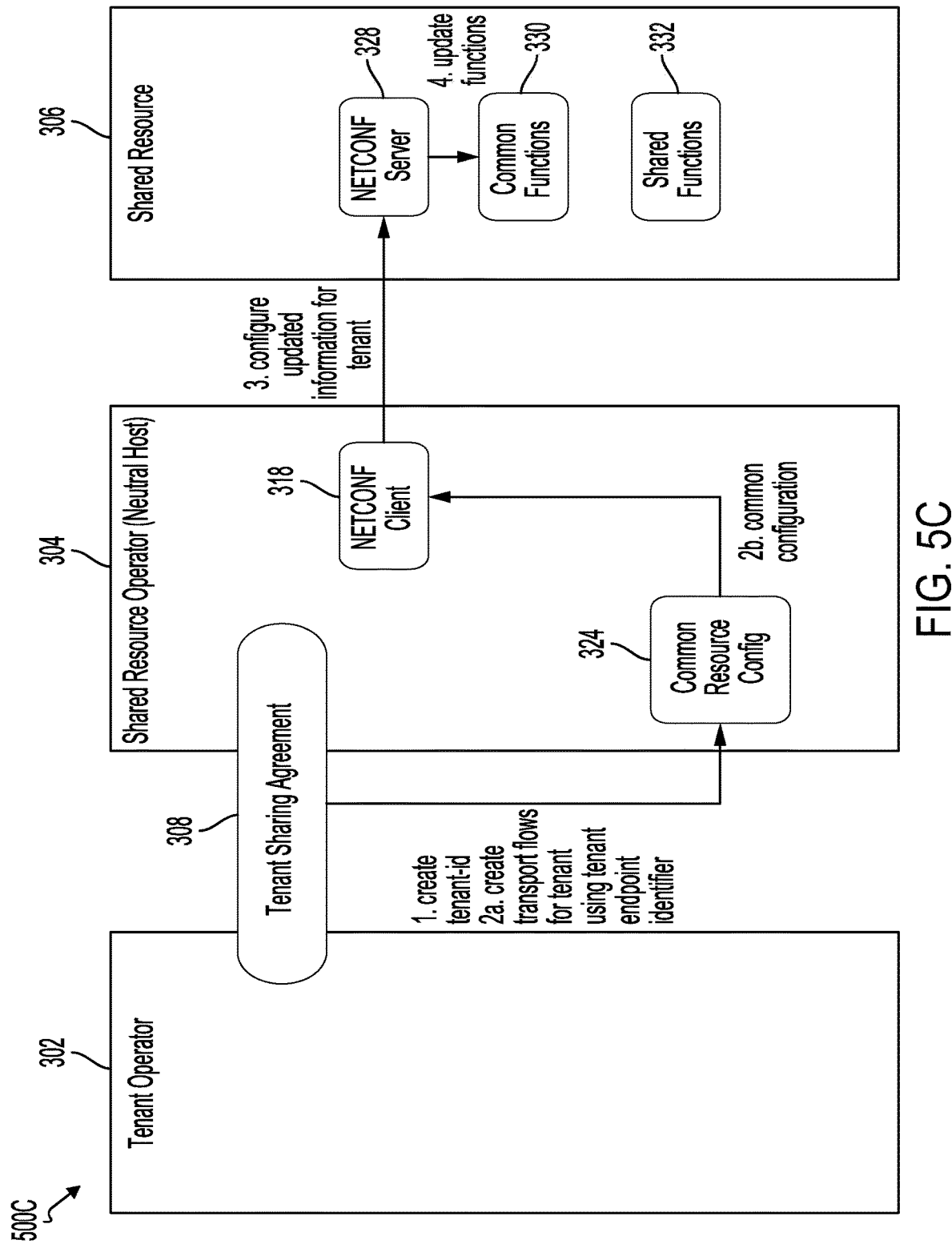

For example, as shown in FIG. 5C, the shared resource configuration is updated with a tenant ID for the tenant operator 302 such that a tenant-id is created for the tenant operator 302 (1) and transport flows are created (2) for the tenant using a tenant endpoint identifier (e.g., processing element endpoint created for the tenant operator 302/O-DU). A common resource configuration for the shared O-RU 306 is generated by the shared O-RU operator 304 (2b) and user account provisioning is configured for the shared O-RU 306 using the updated information for the tenant operator 302 (3) through which various common functions are also updated for the shared O-RU 306 (4).

Figure 5D:
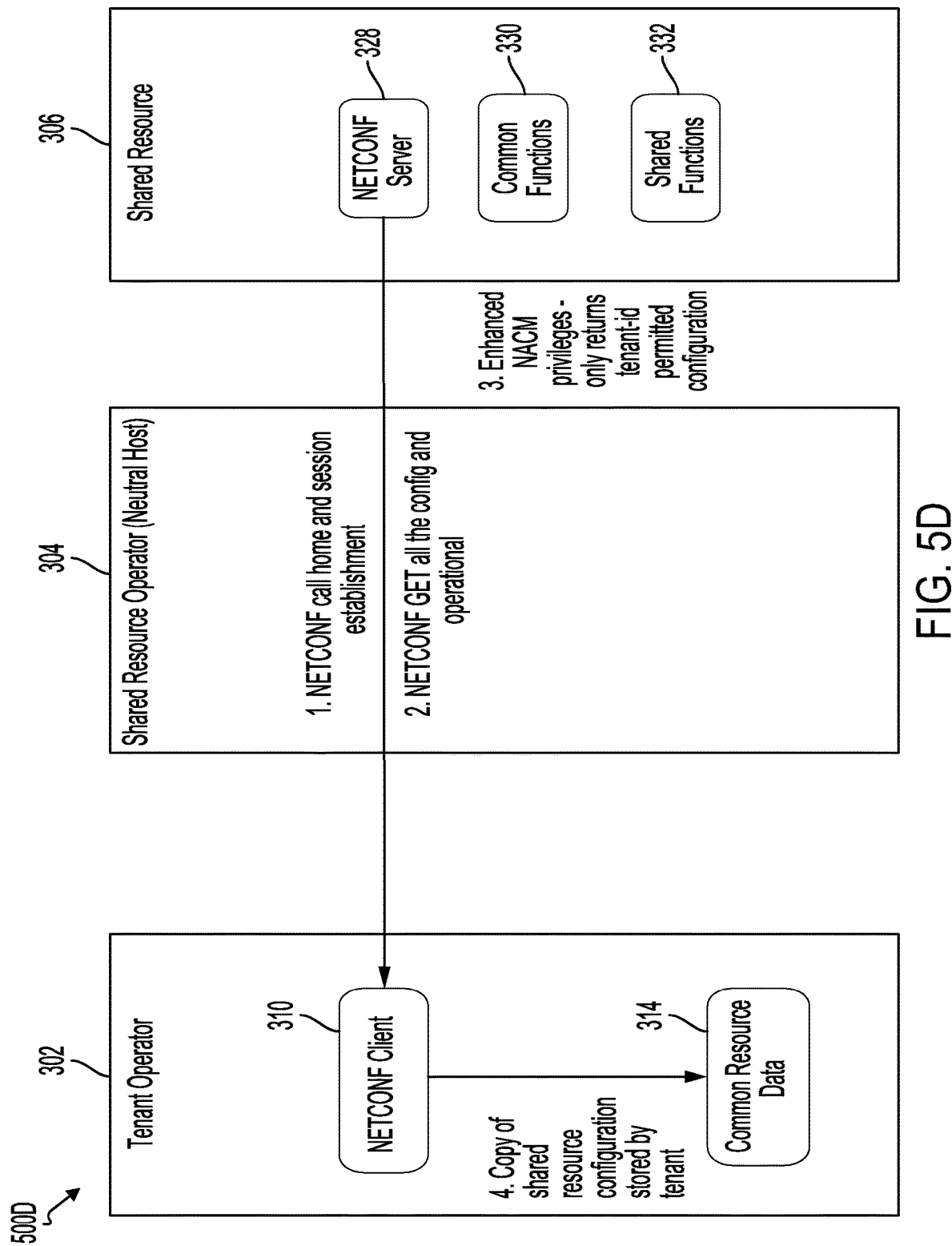

Following the user account provisioning, as shown in FIG. 5D for a fourth step (Step 4), the shared O-RU 306 triggers a NETCONF call home procedure via its NETCONF server with the NETCONF client of the tenant operator 302 for session establishment between NETCONF server 328 of the shared O-RU 306 and the NETCONF client 412 of the tenant operator 302 (1). The NETCONF client can initiate a GET operation to obtain resource configuration and operational information for the tenant operator 302 from the shared O-RU 306 (2).

Utilizing the enhanced NACM read privileges as defined herein the tenant operator 302 (NETCONF client) can only obtain/recover (read) permitted resource configuration and operational information as configured for the tenant, based on the tenant-id (3). A copy of the shared resource configuration/information is stored by the tenant (4).

In accordance with embodiments herein, the O-RU NETCONF Access Control Model (NACM) can be enhanced for operation with NETCONF clients corresponding to tenants of the shared O-RU. Specifically, the NETCONF Access Control techniques defined for group name "tenant-odu" can be further refined for the following YANG models:

urn:o-ran:processing-elements:x.y urn:o-ran:uplane-conf:x.y urn:o-ran:performance-management:x.y urn:o-ran:message5:x.y For the above models, the read privileges for specific node-instance-identifiers can be refined based on the tenant-id associated with the user account of the NETCONF client, as described TABLE 2, below.

TABLE 2

Refined NETCONF Access Control Read Privileges for the "tenant-odu" Group

| Module Name | Restricted node-instance-identifier | Refined privileges for "tenant-odu" group |
|---|---|---|
| urn:o-ran:processing-elements:x.y | o-ran-elements:processing-elements/o-ran-elements:ru-elements | A NETCONF client with user name containing a configured tenant-id may only have read privileges for those list entries where the o-ran-elements:processing-elements/o-ran-elements:ru-elements/o-ran-elements:tenant-id leaf is identical to the tenant-id of the NETCONF client. |
| urn:o-ran:uplane-conf:x.y | o-ran-uplane-conf:user-plane-configuration/o-ran-uplane-conf:low-level-tx-links | A NETCONF client with user name containing a configured tenant-id may only have read privileges for those list entries where the o-ran-uplane-conf:user-plane-configuration/o-ran-uplane-conf:low-level-tx-links/o-ran-uplane-conf:process-element leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:uplane-conf:x.y | o-ran-uplane-conf:user-plane-configuration/o-ran-uplane-conf:low-level-rx-links | A NETCONF client with user name containing a configured tenant-id may only have read privileges for those list entries where the o-ran-uplane-conf:user-plane-configuration/o-ran-uplane-conf:low-level-rx-links/o-ran-uplane-conf:process-element leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:uplane-conf:x.y | o-ran-uplane-conf:user-plane-configuration/o-ran-uplane-conf:tx-array-carriers | A NETCONF client may only have read privileges for those list entries where the o-ran-uplane-conf:user-plane-configuration/o-ran-uplane-conf:tx-array-carriers/o-ran-uplane-conf:name leaf is referenced in a list entry of o-ran-uplane-conf:user-plane-configuration/o-ran-uplane-conf:low-level-tx-links to which the NETCONF client has read access privileges. |
| urn:o-ran:uplane-conf:x.y | o-ran-uplane-conf:user-plane-configuration/o-ran-uplane-conf:rx-array-carriers | A NETCONF client may only have read privileges for those list entries where the o-ran-uplane-conf:user-plane-configuration/o-ran-uplane-conf:rx-array-carriers/o-ran-uplane-conf:name leaf is referenced in a list entry of o-ran-uplane-conf:user-plane-configuration/o-ran-uplane-conf:low-level-rx-links to which the NETCONF client has read access privileges. |
| urn:o-ran:uplane-conf:x.y | o-ran-uplane-conf:user-plane-configuration/o-ran-uplane-conf:low-level-tx-endpoints | A NETCONF client may only have read privileges for those list entries where the o-ran-uplane-conf:user-plane-configuration/o-ran-uplane-conf:low-level-tx-endpoints/o-ran-uplane-conf:name leaf is referenced in a list entry of o-ran-uplane-conf:user-plane-configuration/o-ran-uplane-conf:low-level-tx-links to which the NETCONF client has read access privileges. |
| urn:o-ran:uplane-conf:x.y | o-ran-uplane-conf:user-plane-configuration/o-ran-uplane-conf:low-level-rx-endpoints | A NETCONF client may only have read privileges for those list entries where the o-ran-uplane-conf:user-plane-configuration/o-ran-uplane-conf:low-level-rx-endpoints/o-ran-uplane-conf:name leaf is referenced in a list entry of o-ran-uplane-conf:user-plane-configuration/o-ran-uplane-conf:low-level-rx-links to which the NETCONF client has read access privileges. |
| urn:o-ran:performance-management:x.y | o-ran-pm:performance-measurement-objects/o-ran-pm:rx-window-measurement-objects | A NETCONF client with user name containing a configured tenant-id may only have read privileges for those list entries where the o-ran-pm:performance-measurement-objects/o-ran-pm:rx-window-measurement-objects/o-ran-pm:rx-measured-result/o-ran-pm:name leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:performance-management:x.y | o-ran-pm:performance-measurement- | A NETCONF client with user name containing a configured tenant-id may only have read privileges for those list entries where the o-ran- |

TABLE 2-continued

Refined NETCONF Access Control Read Privileges for the "tenant-odu" Group

| Module Name | Restricted node-instance-identifier | Refined privileges for "tenant-odu" group |
|---|---|---|
| | objects/o-ran-pm:tx-measurement-objects | pm:performance-measurement-objects/o-ran-pm:tx-measurement-objects/o-ran-pm:tr-measured-result/o-ran-pm:name leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:message5:x.y | o-ran-msg5:ecpri-delay-message/o-ran-msg5:message5-sessions/o-ran-msg5:session-parameters | A NETCONF client with user name containing a configured tenant-id may only have read privileges for those list entries where the o-ran-msg5:ecpri-delay-message/o-ran-msg5:message5-sessions/o-ran-msg5:session-parameter/o-ran-msg5:processing-element-name leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |

Consider an example in which the shared O-RU 306 has been configured to operate with two tenants, tenant-id 237 and tenant-id 248, then when a NETCONF client of the first tenant attempts to read the processing element configuration of the shared O-RU it may receive a reply as shown below in TABLE 3, where the O-DU of the first tenant has an Ethernet MAC-address of 11:95:a0:af:5f:b9 and a VLAN 100 is being used for the control and user-plane traffic between the shared O-RU and the O-DU of the first tenant.

TABLE 3

Tenant Read Access Control Example

```
<rpc-reply message-id="101" xmlns="urn:ietf:params:xml:ns:netconf:base:1.0">
    <data>
        <processing-elements xmlns="urn:o-ran:processing-element:1.0">
            <ru-elements>
                <name>element0</name>
                <tenant-id>tenant237</tenant-id>
                <transport-flow>
                    <interface-name>10GEth0.100</interface-name>
                    <eth-flow>
                        <ru-mac-address>00:e0:fe:00:23:30</ru-mac-address>
                        <vlan-id>100</vlan-id>
                        <o-du-mac-address>11:95:a0:af:5f:b9</o-du-mac-address>
                    </eth-flow>
                </transport-flow>
            <ru-elements>
        <processing-elements>
    </data>
</rpc-reply>
```

Conversely, if the NETCONF client of the second tenant attempts to read the processing element configuration, it may receive a replay as shown below, in TABLE 4, where the O-DU of the second tenant has an Ethernet MAC-address of 5a:2a:a7:61:98:f0 and VLAN 200 is being used for the control and user-plane traffic between the shared O-RU and the O-DU of the second tenant.

TABLE 4

Additional Tenant Read Access Control Example

```
<rpc-reply message-id="101" xmlns="urn:ietf:params:xml:ns:netconf:base:1.0">
    <data>
        <processing-elements xmlns="urn:o-ran:processing-element:1.0">
            <ru-elements>
                <name>element0</name>
                <tenant-id>tenant248</tenant-id>
                <transport-flow>
                    <interface-name>10GEth0.200</interface-name>
                    <eth-flow>
                        <ru-mac-address>00:e0:fe:00:23:30</ru-mac-address>
                        <vlan-id>200</vlan-id>
                        <o-du-mac-address>5a:2a:a7:61:98:f0</o-du-mac-address>
                    </eth-flow>
                </transport-flow>
            <ru-elements>
        <processing-elements>
    </data>
</rpc-reply>
```

Figure 5E:
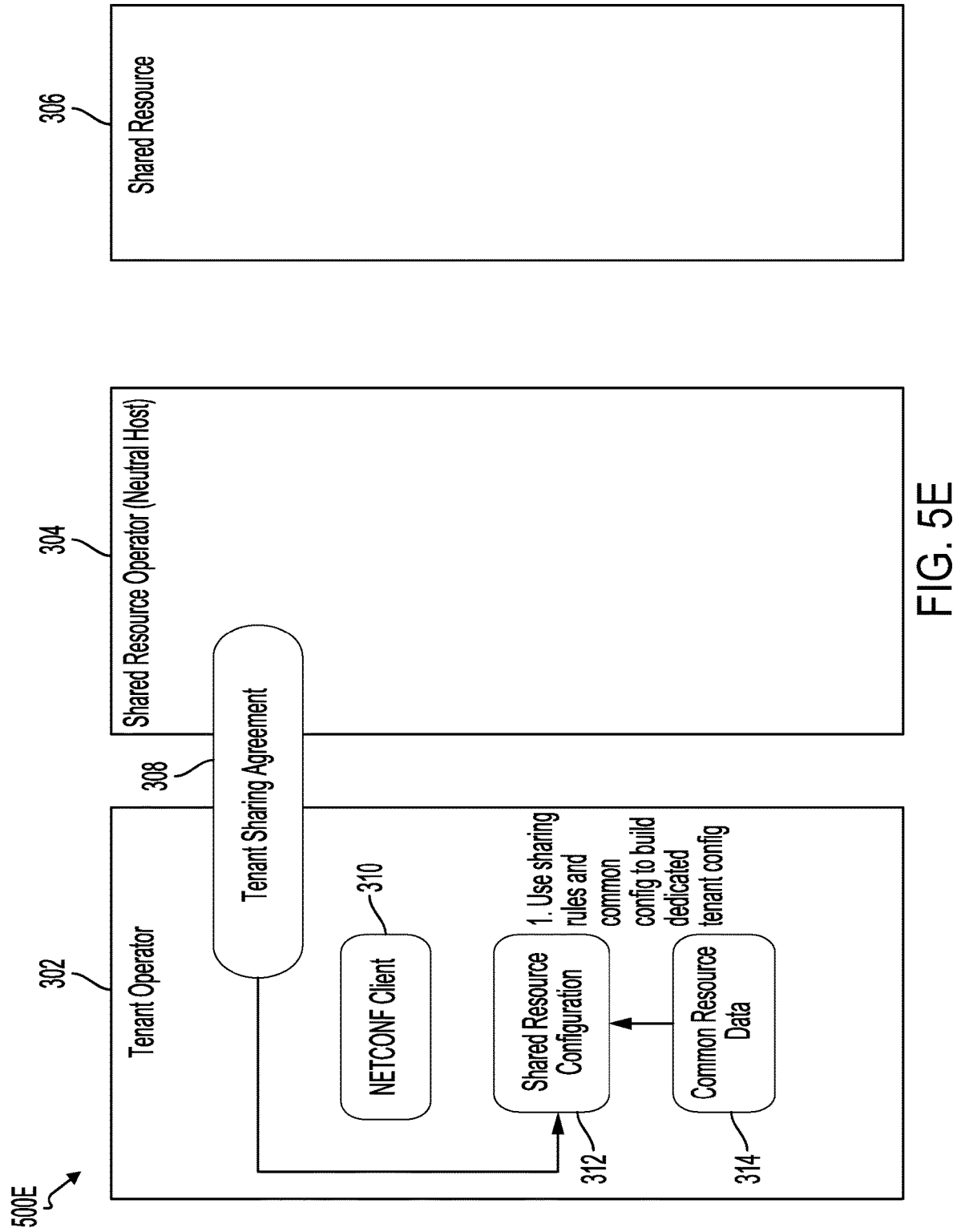

As shown in FIG. 5E for a fifth step (Step 5), a dedicated tenant configuration for operation of the shared O-RU 306 by the tenant operator 302 is built by the tenant operator 302 based on the tenant sharing agreement (sharing rules) and common resource configuration/information obtained based on Step 4, discussed above with reference to FIG. 5D.

Figure 5F:
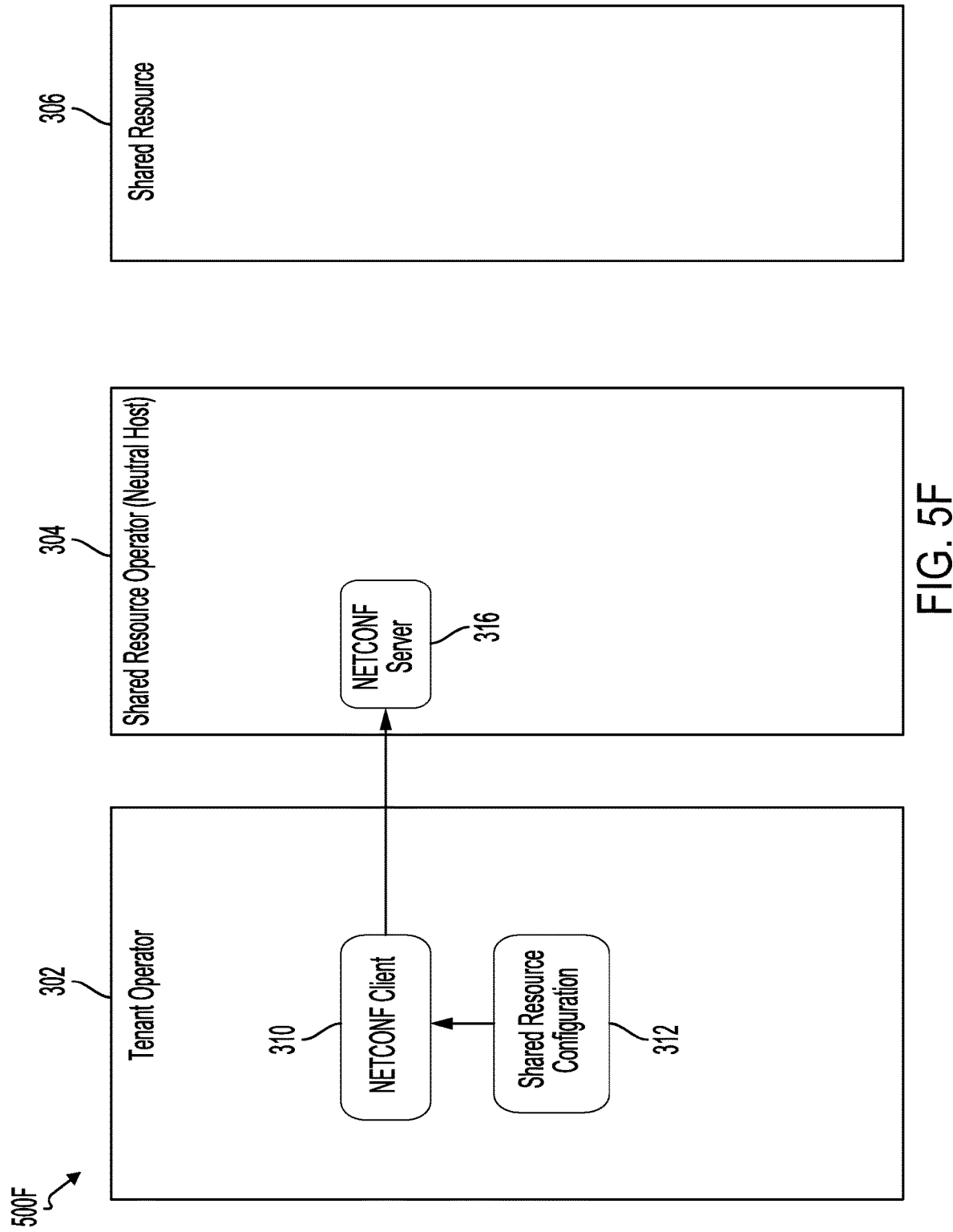

As shown in FIG. 5F for a sixth step (Step 6), the tenant operator 302 signals the tenant configuration to the NETCONF server of the shared O-RU operator 304. As noted above, various NETCONF access control write privileges can be used to restrict a tenant from directly configuring those aspects of the shared O-RU that involve validation by the shared O-RU operator 304. Instead, the shared O-RU operator 304 is responsible for validating that the configuration of the shared O-RU conforms with the partitioning of shared O-RU resources, as agreed to between the shared O-RU operator 304 and the tenant operator 302 of the shared O-RU. The O-RU is not aware of any such partitioning rules. The validation can be performed using a "pass through" configuration approach.

The NETCONF server of the shared O-RU operator 304 may be responsible for receiving the configuration from the tenant operators that is to be validated by the shared O-RU operator 304 before the configuration is committed to the shared O-RU. The NETCONF server of the shared O-RU operator 304 may implement the o-ran-wg4-aggregation YANG model, which is used to mount a set of YANG models. The NETCONF Server of the shared O-RU operator 304 may only support the "sudo" and "tenant-odu" access control groups. Various NACM read (R), write (W), and execute (X) privileges for the NETCONF server of the shared O-RU operator 304 are shown in TABLE 5, below.

o-ran-compression-factors
o-ran-wg4-features
o-ran-usermgmt
iana-hardware
iana-if-type
iana-hardware
ietf-interfaces
ietf-ip
ietf-inet-types
ietf-yang-types
ietf-netconf-acm
ietf-hardware

TABLE 5

Mapping of Account Groupings to Shared O-RU Operator Module Privileges

| Module Rules | sudo | nms | fm-pm | swm | smo | hybrid-odu | tenant-odu |
|---|---|---|---|---|---|---|---|
| "urn:o-ran-wg4-aggregation:x.y" | RW- | — | — | — | — | — | RW-$_{note1}$ |
| "urn:o-ran:hardware:x.y" | RWX | — | — | — | — | — | R-- |
| "urn:ietf:params:xml:ns:yang:ietf-hardware" | RWX | — | — | — | — | — | R-X |
| "urn:ietf:params:xml:ns:yang:iana-hardware" | R-- | — | — | — | — | — | R-- |
| "urn:o-ran:user-mgmt:x.y" | RWX | — | — | — | — | — | — |
| "urn:o-ran:module-cap:x.y" | RW- | — | — | — | — | — | R-- |
| "urn:o-ran:uplane-conf:x.y" | RWX | — | — | — | — | — | RWX$_{note2,note3}$ |
| "urn:o-ran:interfaces:x.y" | RWX | — | — | — | — | — | R-- |
| "urn:ietf:params:xml:ns:yang:ietf-ip" | RW- | — | — | — | — | — | R-- |
| "urn:ietf:params:xml:ns:yang:ietf-interfaces" | RW- | — | — | — | — | — | R-- |
| "urn:o-ran:processing-elements:x.y" | RW- | — | — | — | — | — | R-- |
| "urn:ietf:params:xml:ns:yang:ietf-netconf-acm" | RW- | — | — | — | — | — | R-- |
| "urn:ietf:params:xml:ns:yang:ietf-yang-library" | R-X | — | — | — | — | — | R-X |
| "urn:ietf:params:xml:ns:yang:ietf-netconf-monitoring" | R-X | — | — | — | — | — | R-X |
| "urn:ietf:params:xml:ns:yang:ietf-netconf-notifications" | --X | — | — | — | — | — | --X |

$_{Note1}$The read privileges for a tenant-odu are refined based on the tenant-id as defined herein
$_{Note2}$The read privileges for a tenant-odu are refined based on the tenant-id as defined herein
$_{Note3}$The write privileges for a tenant-odu are refined based on the tenant-id as defined herein The shared O-RU operator 304 can expose the data-models of the connected shared O-RU to the tenant operator 302 by a set of aggregated YANG models. The shared O-RU operator 304 uses the o-ran-wg4-aggregation YANG model to be able to aggregate the separate shared O-RU data models. The shared O-RU operator 304 can configure the ietf-yang-schema-mount.yang data model in an xml format for the configuration of the aggregated shared O-RU. TABLE 6, below, illustrates an example configuration of the shared O-RU schema mount point.

TABLE 6

Configuration of Shared O-RU Schema Mount Point

```
<schema-mounts>
  <mount-point>
    <module>o-ran-wg4-aggregation</module>
    <label>root</label>
    <config>true</config>
    <inline></inline>
  </mount-point>
</schema-mounts>
```

The shared O-RU operator 304 can mount the ietf-yang-library at the root mount point for the NETCONF server. The instantiation of ietf-yang-library may at least indicate that the following schemas are mounted at the root mount point:
o-ran-uplane-conf
o-ran processing-element
o-ran-interfaces
o-ran-hardware
o-ran-module-cap Regarding tenant identity handling, as highlighted in FIG. 5C, the shared O-RU operator 304 can use the o-ran-usermgmt model to configure user accounts on the NETCONF server of the shared O-RU. The shared O-RU operator 304 is to ensure that the tenant-id allocated to a NETCONF client for an account on the operator NETCONF server is identical to the tenant-id allocated to the same NETCONF client for an account on the NETCONF server on the shared O-RU.

As discussed above, the enhanced tenant-id based NETCONF access control model discussed above with reference to TABLE 2 refines the read access privileges to specific YANG models based on tenant-id. The same refined read privileges may be applied when the identical YANG models are mounted using the o-ran-wg4-aggregation YANG model implemented by the NETCONF server of the shared O-RU operator 304. The criteria to handle tenant identities consistently on both NETCONF servers ensures that a tenant (e.g., the tenant operator 302 of the present example) is only able to recover the same restricted set of information, either directly from the shared O-RU or indirectly via the shared O-RU operator 304. In addition, the NETCONF server may implement enhanced read access privileges to the tenant-status list defined in the o-ran-wg4-aggregation YANG model. The NETCONF server of the shared O-RU operator 304 may only permit a NETCONF client to read the list entries where the tenant-id key of the list entry matches the tenant-id allocated to a given NETCONF client.

In addition to the enhanced read access privileges, the NETCONF server of the shared O-RU operator 304 may implement additional write access privileges for the following YANG models that are mounted using the o-ran-wg4-aggregation model:
    urn:o-ran:uplane-conf:x.y For the above model, the write privileges for specific node-instance-identifiers can be refined based on the tenant-id associated with the user account (tenant operator 302) of the NETCONF client, as described in TABLE 7, below.

TABLE 7

Refined NETCONF Access Control Write Privileges for the "tenant-odu" Group

| Module Name | Restricted node-instance-identifier | Refined privileges for "tenant-odu" group |
|---|---|---|
| urn:o-ran:uplane-conf:x.y | o-ran-uplane-conf:user-plane-configuration/o-ran-uplane-conf:low-level-tx-links | A NETCONF client with user name containing a configured tenant-id may have write privileges for those list entries where the o-ran-uplane-conf:user-plane-configuration/o-ran-uplane-conf:low-level-tx-links/o-ran-uplane-conf:process-element leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:uplane-conf:x.y | o-ran-uplane-conf:user-plane-configuration/o-ran-uplane-conf:low-level-rx-links | A NETCONF client with user name containing a configured tenant-id shall ONLY have write privileges for those list entries where the o-ran-uplane-conf:user-plane-configuration/o-ran-uplane-conf:low-level-rx-links/o-ran-uplane-conf:process-element leaf refers to an o-ran-elements:processing-elements/o-ran-elements:ru-elements list entry where the o-ran-elements:processing-elements/o-ran-elements:ru-elements/o-ran-elements:tenant-id leaf is identical to the tenant-id of the NETCONF client. |
| urn:o-ran:uplane-conf:x.y | o-ran-uplane-conf:user-plane-configuration/o-ran-uplane-conf:tx-array-carriers | A NETCONF client shall ONLY have write privileges for those list entries where the o-ran-uplane-conf:user-plane-configuration/o-ran-uplane-conf:tx-array-carriers/o-ran-uplane-conf:name leaf is referenced in a list entry of o-ran-uplane-conf:user-plane-configuration/o-ran-uplane-conf:low-level-tx-links to which the NETCONF client has write access privileges. |
| urn:o-ran:uplane-conf:x.y | o-ran-uplane-conf:user-plane-configuration/o-ran-uplane-conf:rx-array-carriers | A NETCONF client shall ONLY have write privileges for those list entries where the o-ran-uplane-conf:user-plane-configuration/o-ran-uplane-conf:rx-array-carriers/o-ran-uplane-conf:name leaf is referenced in a list entry of o-ran-uplane-conf:user-plane-configuration/o-ran-uplane-conf:low-level-rx-links to which the NETCONF client has write access privileges. |
| urn:o-ran:uplane-conf:x.y | o-ran-uplane-conf:user-plane-configuration/o-ran-uplane-conf:low-level-tx-endpoints | A NETCONF client shall ONLY have write privileges for those list entries where the o-ran-uplane-conf:user-plane-configuration/o-ran-uplane-conf:low-level-tx-endpoints/o-ran-uplane-conf:name leaf is referenced in a list entry of o-ran-uplane-conf:user-plane-configuration/o-ran-uplane-conf:low-level-tx-links to which the NETCONF client has write access privileges. |
| urn:o-ran:uplane-conf:x.y | o-ran-uplane-conf:user-plane-configuration/o-ran-uplane-conf:low-level-rx-endpoints | A NETCONF client shall ONLY have write privileges for those list entries where the o-ran-uplane-conf:user-plane-configuration/o-ran-uplane-conf:low-level-rx-endpoints/o-ran-uplane-conf:name leaf is referenced in a list entry of o-ran-uplane-conf:user-plane-configuration/o-ran-uplane-conf:low-level-rx-links to which the NETCONF client has write access privileges. |

Figure 5G:
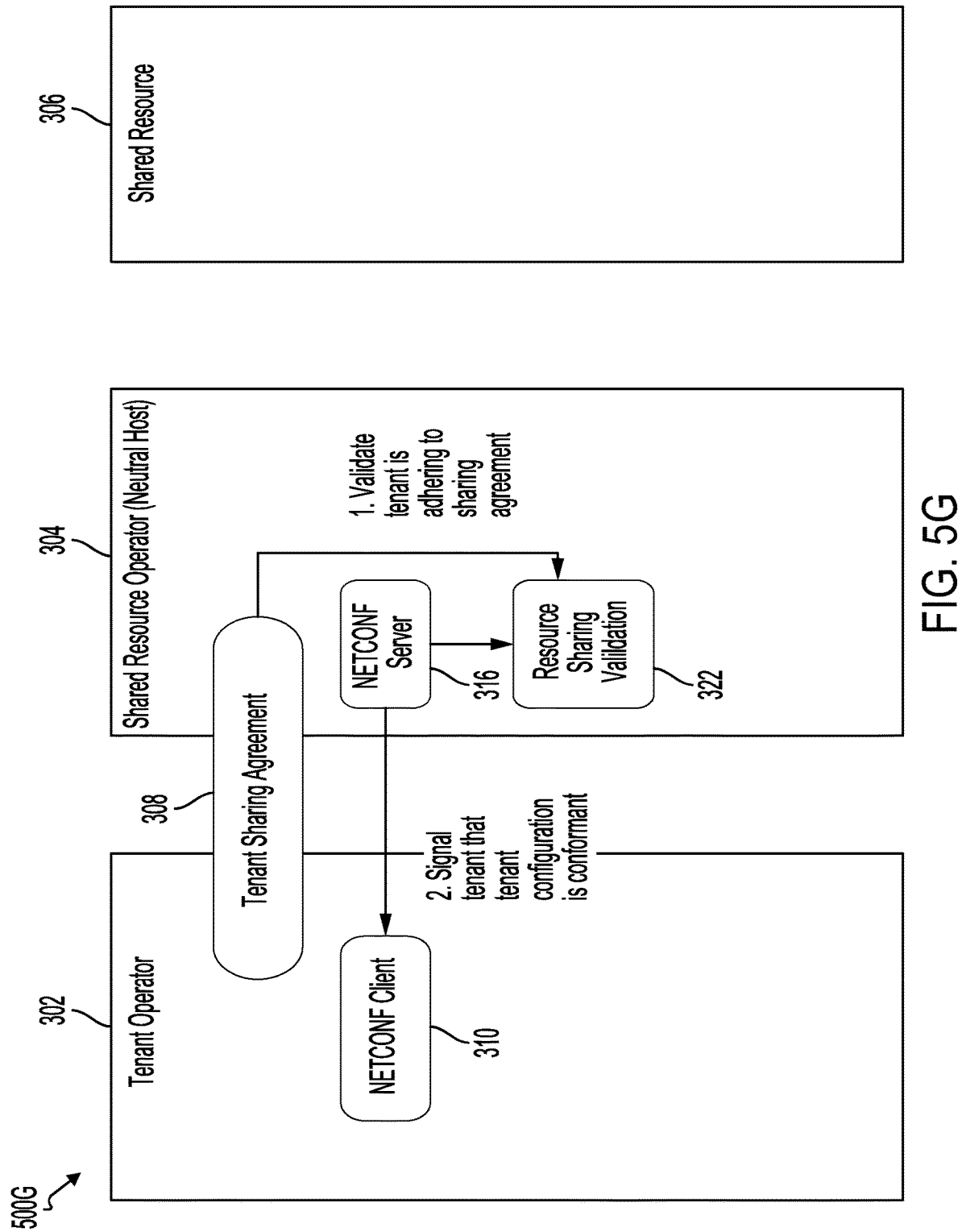

Next, as shown in FIG. 5G for a seventh step (Step 7), the shared resource operator (shared O-RU operator 304) validates the tenant configuration to validate (1) that a carrier configuration received from a tenant operator 302 conforms with the partitioning rules for the shared O-RU resources. If a configuration attempted by the tenant operator 302 contravenes the partitioning rules, the shared O-RU operator 304 can reject the configuration by the tenant operator 302, with an "access-denied" error. An error information element can be used to provide more information regarding the partitioning rules that are to be observed.

An <ok/> rpc-reply to an <edit-config> of schemas mounted using the o-ran-wg4-aggregated YANG model indicates that the configuration has been validated as conformant by the shared O-RU operator 304 (2) but does not indicate that the same configuration has been committed to the corresponding shared O-RU. Rather, the reply to the tenant operator 302 means that the committed configuration from the tenant operator 302 only reflects committed changes to the aggregated shared O-RU configuration database operated by the shared O-RU operator 304.

Figure 5H:
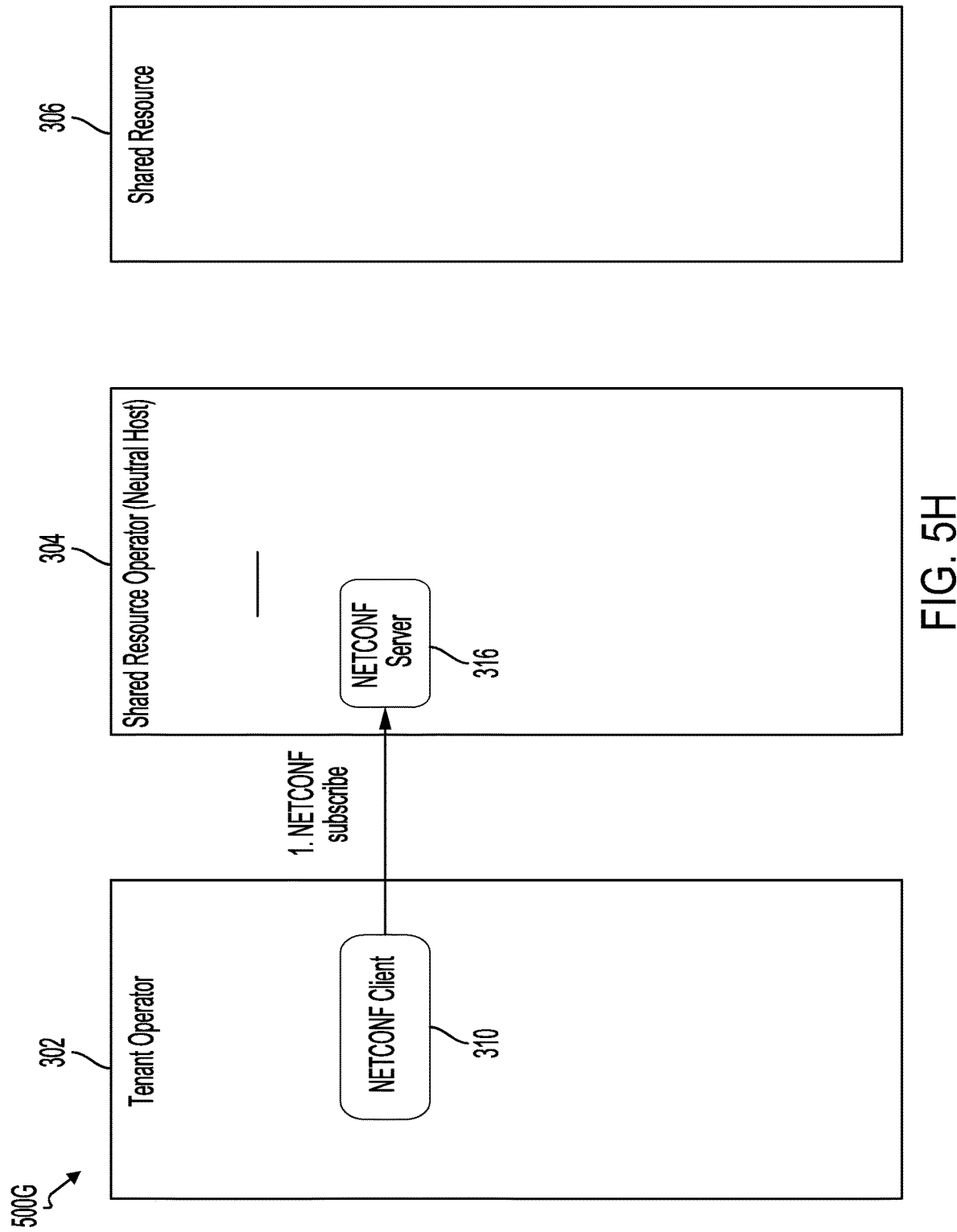

In some instance, as shown in FIG. 5H for an eighth step (Step 8), the tenant operator 302 can subscribe to notifications regarding whether the tenant configuration is successfully committed to the shared O-RU. As noted above, the NETCONF server of the shared O-RU operator 304 may support the Notification of Updates to its Configuration Datastore functionality, which enables the tenant operator 302 to configure subscriptions to receive notifications of modifications to the tenant-status list and enabling the tenant to be signaled when the aggregated carrier configuration status has changed from PENDING to COMMITTED for a specific ru-instance-id.

Continuing to FIG. 5I for a ninth step (Step 9), the shared O-RU operator 304 can generate a composite configuration for the shared O-RU, which is a combination of the common and tenant-defined configurations. More specifically, the shared O-RU operator 304 will take the configuration from a mounted schema in the o-ran-wg4-aggregation YANG model and use the ru-instance-id to map from the aggregated model to the configuration datastore for an individual shared O-RU. Generally, operations illustrated for FIGS. 5A-5K may represent a first stage of the enhanced techniques provided herein and operations illustrated for FIGS. 5J and 5K may represent a second stage of the enhanced techniques provided herein.

Figure 5J:
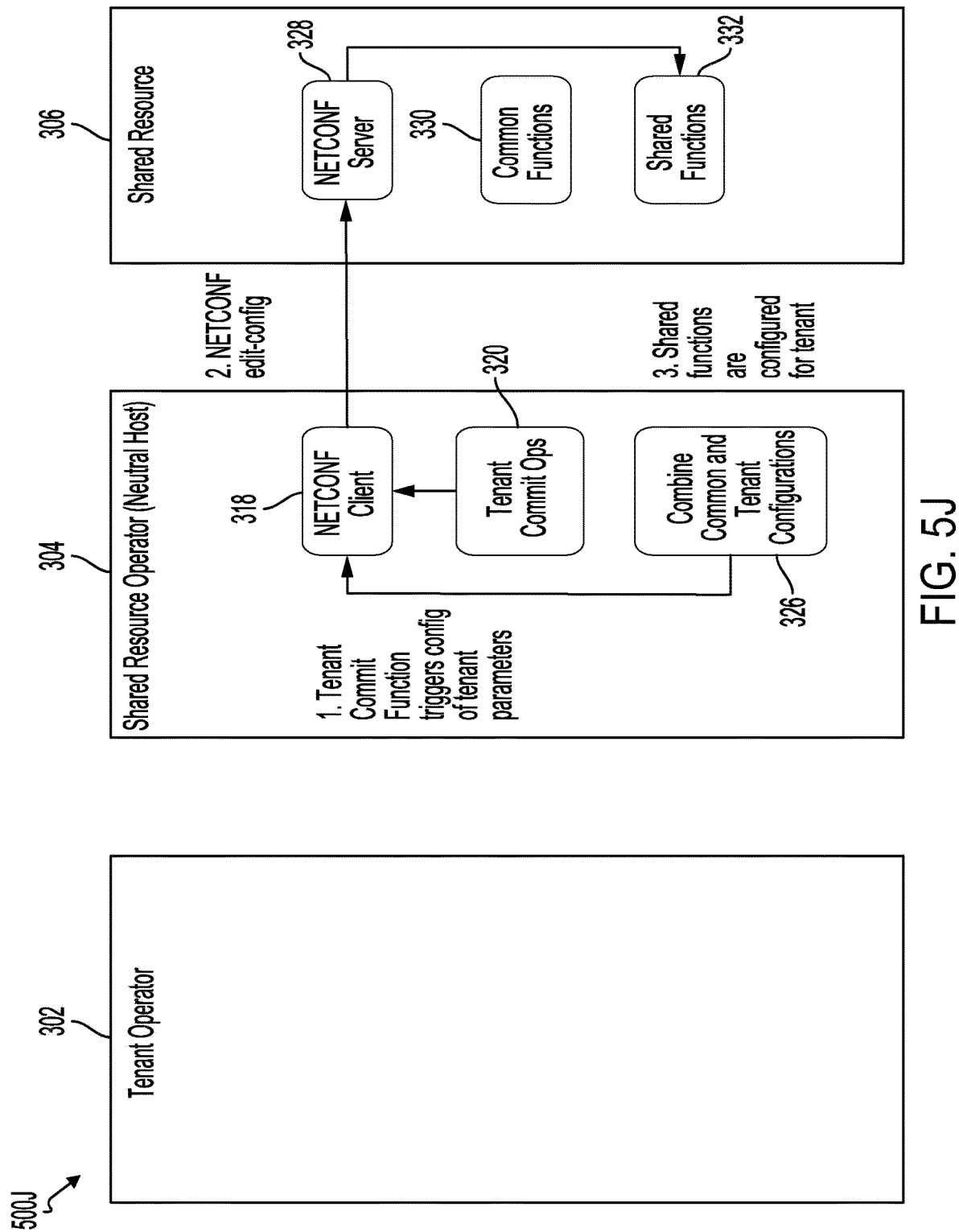
Figure 5K:
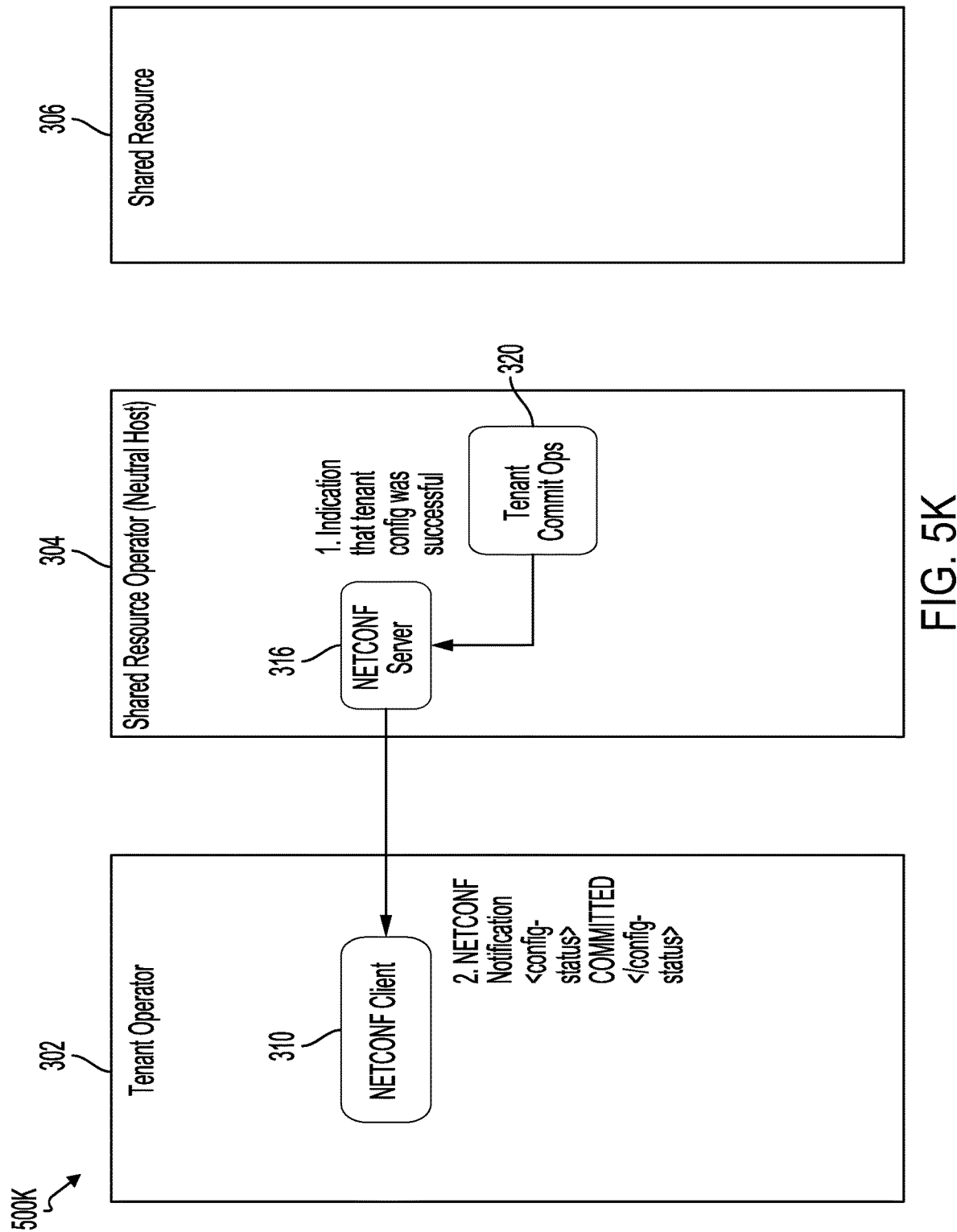

As illustrated in FIG. 5J for a tenth step (Step 10), a second stage is utilized to commit the tenant operator 302 configuration to the shared O-RU. As illustrated in FIG. 5K, an additional step (Step 11) is utilized to confirm the committed configuration from the tenant operator 302 has been committed to a shared O-RU. To enable such a two-stage approach, a separate config-status schema-node (as illustrated in TABLE 1, above) is used by the shared O-RU operator 304 to indicate to the tenant operator when the aggregated configuration has been committed to an individual O-RU. Thereafter, the tenant operator can utilize the shared O-RU in accordance with the tenant sharing agreement.

Figure 6:
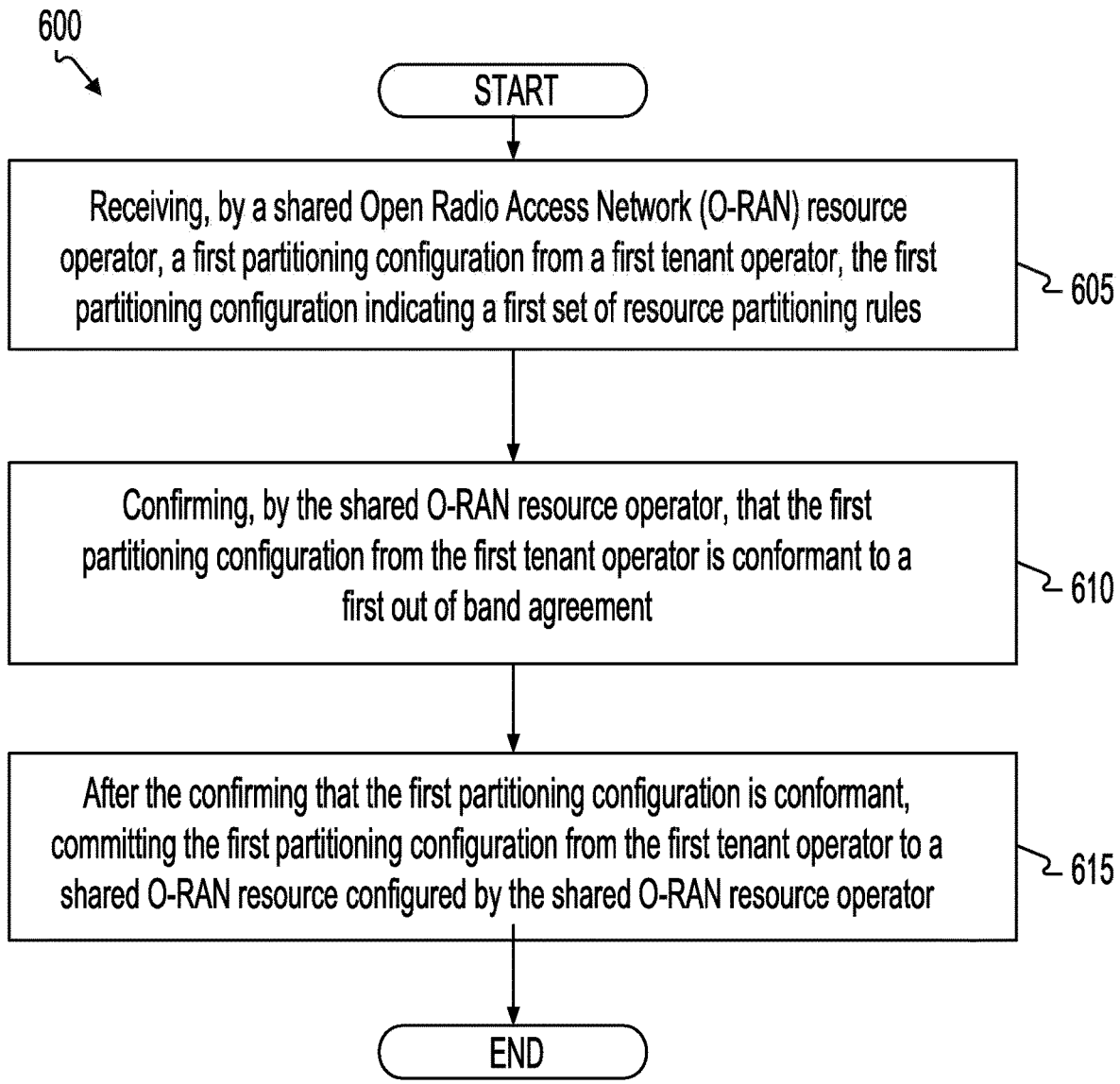
FIG. 6 illustrates an example method for validating and committing a shared O-RU configuration in accordance with some aspects of the present technology.
Figure 7:
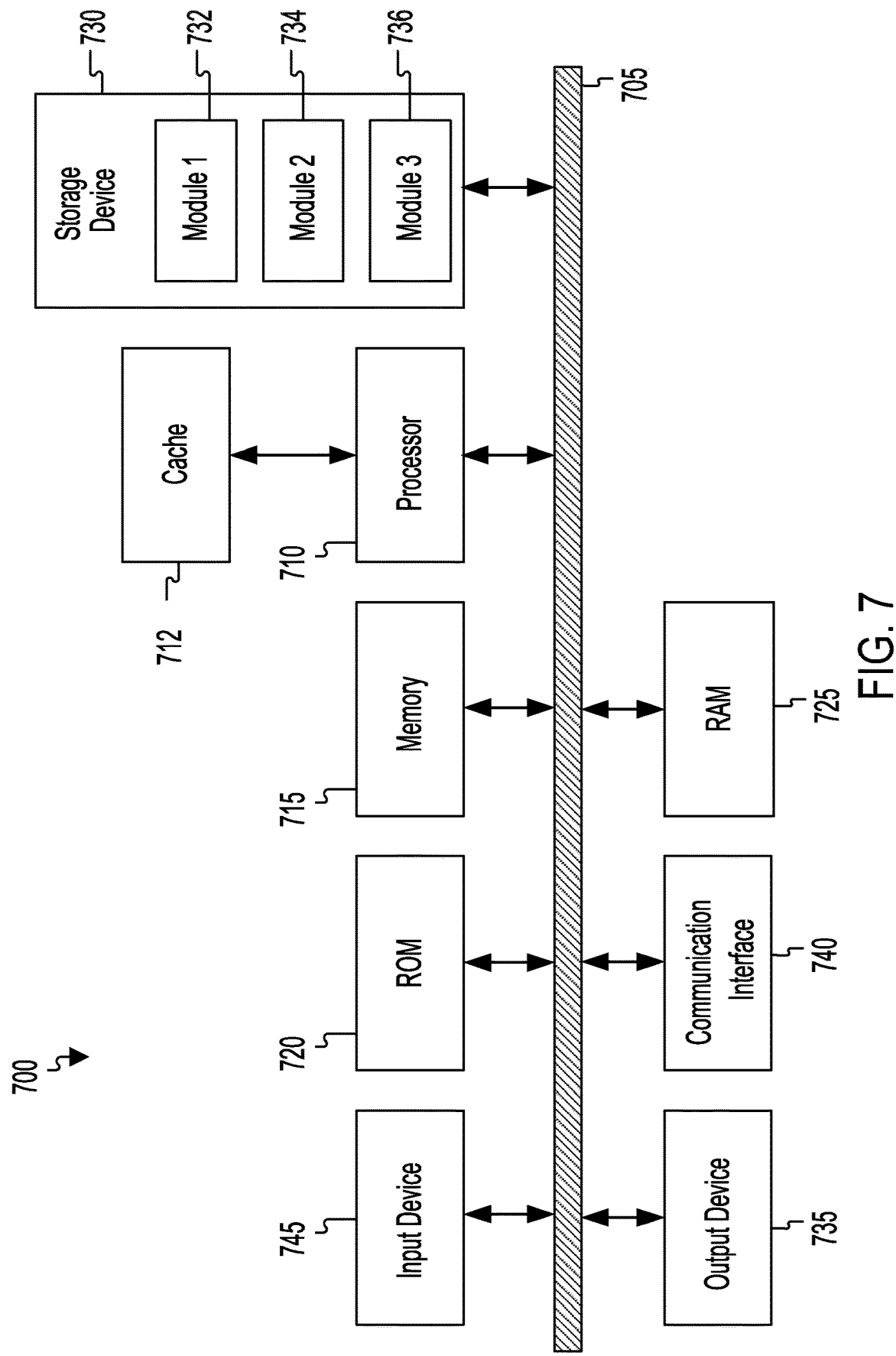
FIG. 7 shows an example of a computing system in accordance with some aspects of the present technology.

FIG. 6 illustrates an example method 600 for validating and committing a shared O-RU configuration via a shared O-RU operator 304, according to an example of the instant disclosure. Although the example method 600 depicts a particular sequence of operations, the sequence may be altered without departing from the scope of the present technology. For example, some of the operations depicted may be performed in parallel or in a different sequence that does not materially affect the function of the method 600. In other examples, different components of an example device or system that implements the method 600 may perform functions at substantially the same time or in a specific sequence.

According to some aspects, the method includes receiving, by a shared Open Radio Access Network (O-RAN) resource operator, a first partitioning configuration from a first tenant operator, at step 605. For example, the shared resource (O-RU) operator 304 illustrated in FIG. 3 may receive, by a shared Open Radio Access Network (O-RAN) resource operator, a first partitioning configuration from a first tenant operator.

According to some aspects, the method includes confirming, by the shared O-RAN resource operator, that the first partitioning configuration from the first tenant operator is conformant to a first out of band agreement at step 610. For example, the shared resource (O-RU) operator 304 illustrated in FIG. 3 may confirm, by the shared O-RAN resource operator, that the first partitioning configuration from the first tenant operator is conformant to a first out of band agreement.

According to some aspects, the method includes after the confirming that the first partitioning configuration is conformant, committing the first partitioning configuration from the first tenant operator to a shared O-RAN resource configured by the shared O-RAN resource operator at step 615. For example, the shared resource (O-RU) operator 304 illustrated in FIG. 3 may commit the first partitioning configuration from the first tenant operator to a shared O-RAN resource configured by the shared O-RAN resource operator. In some aspects, the first partitioning configuration requires radiating within a set spectrum while operating the shared O-RAN resource.

In some aspects, the shared O-RAN resource is at least a part of a base station. In some aspects, the shared O-RAN resource operator implements a Network Configuration Protocol (NETCONF) server. In some aspects, the NETCONF server receives the first partitioning configuration from the first tenant operator 302, and requires the first partitioning configuration to be validated by the shared O-RAN resource server before the first partitioning configuration is committed to the shared O-RAN resource. In some aspects, the first partitioning configuration is signaled using NETCONF-based transport of a Yet Another Next Generation-defined (YANG-defined) data model. In some aspects, the first partitioning configuration of the shared O-RAN resource is modeled using a schema mount operation. In some aspects, the YANG-defined data model for the shared O-RAN resource includes a list that includes at least one of a shared resource identity, one or more tenant identities, and a configuration status of each tenant associated with the one or more tenant identities, respectively.

According to some aspects, the method includes receiving a commit operation validation request along with the first partitioning configuration. For example, the shared resource (O-RU) operator 304 illustrated in FIG. 3 may receive a commit operation validation request along with the first partitioning configuration.

According to some aspects, the method includes sending a commit operation validation to the first tenant operator, the commit operation validation informing that the first partitioning configuration has been committed on the shared O-RAN resource. For example, the shared resource (O-RU) operator 304 illustrated in FIG. 3 may send a commit operation validation to the first tenant operator, the commit operation validation informing that the first partitioning configuration has been committed on the shared O-RAN resource.

According to some aspects, the method includes receiving, by the shared O-RAN resource operator, a second partitioning configuration from a second tenant operator. For example, the shared resource (O-RU) operator 304 illustrated in FIG. 3 may receive, by the shared O-RAN resource operator, a second partitioning configuration from a second tenant operator.

According to some aspects, the method includes confirming, by the shared O-RAN resource operator, that second partitioning configuration from the second tenant operator is conformant to a second out of band agreement. For example, the shared resource (O-RU) operator 304 illustrated in FIG. 3 may confirm, by the shared O-RAN resource operator, that second partitioning configuration from the second tenant operator is conformant to a second out of band agreement.

According to some aspects, the method includes committing the second partitioning configuration from the second tenant operator to the shared O-RAN resource. For example, the shared resource (O-RU) operator 304 illustrated in FIG. 3 may commit the second partitioning configuration from the second tenant operator to the shared O-RAN resource. In some aspects, the second tenant operator shares usage of the shared O-RAN resource with the first tenant operator.

According to some aspects, the method includes receiving, from the second tenant operator, a subscription request to be notified of changes in a configuration data store affects the second tenant operator. For example, the shared resource (O-RU) operator 304 illustrated in FIG. 3 may receive, from the second tenant operator, a subscription request to be notified of changes in a configuration data store affects the second tenant operator.

According to some aspects, the method includes sending, to the second tenant operator, a notification when a change that affects the second tenant operator has occurred in the configuration data store. For example, the shared resource (O-RU) operator 304 illustrated in FIG. 3 may send, to the second tenant operator, a notification when a change that affects the second tenant operator has occurred in the configuration data store.

According to some aspects, the method includes provisioning a tenant account and a tenant NETCONF client at the shared O-RAN resource operator. For example, the shared resource (O-RU) operator 304 illustrated in FIG. 3 may provision a tenant account and a tenant NETCONF client at the shared O-RAN resource operator. In some aspects, a configuration status is not specified for the tenant account at the NETCONF server of the shared resource.

According to some aspects, the method includes after the provisioning and before the receiving the first partitioning configuration, establishing a NETCONF session. For example, the shared resource (O-RU) operator 304 illustrated in FIG. 3 may after the provisioning and before the receive the first partitioning configuration, establish a NETCONF session.

According to some aspects, the method includes, after the confirming, setting the configuration status to pending. For example, the shared resource (O-RU) operator 304 illustrated in FIG. 3 may after the confirming, set the configuration status to pending.

According to some aspects, the method includes, after the committing, setting the configuration status to committed. For example, the shared resource (O-RU) operator 304 illustrated in FIG. 3 may after the commit, set the configuration status to committed.

FIG. 7 shows an example of computing system 700, which can be, for example, any computing device making up the shared O-RU 036 and the shared resource (O-RU) operator 304, or any component thereof in which the components of the system are in communication with each other using connection 705. Connection 705 can be a physical connection via a bus or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710.

Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language reciting "at least one of" refers to at least one of a set and indicates that one member of the set or multiple members of the set satisfy the claim. For example, claim language reciting "at least one of A and B" means A, B, or A and B."

Illustrative Examples of the Disclosure Include:

Aspect 1: A method for validating and committing a shared O-RU configuration via a shared O-RU Operator, the method comprising: receiving, by a shared Open Radio Access Network (O-RAN) resource operator, a first partitioning configuration from a first tenant operator; confirming, by the shared O-RAN resource operator, that the first partitioning configuration from the first tenant operator is conformant to a first out of band agreement; and committing the first partitioning configuration from the first tenant operator to a shared O-RAN resource configured by the shared O-RAN resource operator.

Aspect 2: The method of Aspect 1, the method further comprising: receiving a commit operation validation request along with the first partitioning configuration; and sending a commit operation validation to the first tenant operator, the commit operation validation informing that the first partitioning configuration has been committed on the shared O-RAN resource.

Aspect 3: The method of any of Aspects 1 to 2 further comprising: receiving, by the shared O-RAN resource operator, a second partitioning configuration from a second tenant operator; confirming, by the shared O-RAN resource operator, that second partitioning configuration from the second tenant operator is conformant to a second out of band agreement; and after the confirming that the second partitioning configuration is conformant, committing the second partitioning configuration from the second tenant operator to the shared O-RAN resource, wherein the second tenant operator shares usage of the shared O-RAN resource with the first tenant operator.

Aspect 4: The method of any of Aspects 1 to 3, the method further comprising: receiving, from the second tenant operator, a subscription request to be notified of changes in a configuration data store affects the second tenant operator; and sending, to the second tenant operator, a notification when a change that affects the second tenant operator has occurred in the configuration data store.

Aspect 5: The method of any of Aspects 1 to 4, wherein the first partitioning configuration requires radiating within a set spectrum while operating the shared O-RAN resource.

Aspect 6: The method of any of Aspects 1 to 5 where the shared O-RAN resource is at least a part of a base station.

Aspect 7: The method of any of Aspects 1 to 6, wherein the first partitioning configuration is signaled using NETCONF-based transport of a Yet Another Next Generation-defined (YANG-defined) data model.

Aspect 8: The method of any of Aspects 1 to 7, further comprising: provisioning a tenant account and a tenant NETCONF client at the shared O-RAN resource operator, wherein a configuration status is not specified for the tenant account at the NETCONF server; and after the provisioning and before the receiving the first partitioning configuration, establishing a NETCONF session.

Aspect 9: The method of any of Aspects 1 to 8, further comprising: after the confirming, setting the configuration status to pending.

Aspect 10: The method of any of Aspects 1 to 9, further comprising: after the committing, setting the configuration status to committed.

Aspect 11: The method of any of Aspects 1 to 10, wherein the shared O-RAN resource operator implements a Network Configuration Protocol (NETCONF) server, wherein the NETCONF server receives the first partitioning configuration from the first tenant operator and requiring the first partitioning configuration to be validated by the shared O-RAN resource server before the first partitioning configuration is committed to the shared O-RAN resource.

Aspect 12: The method of any of Aspects 1 to 11, where the first partitioning configuration of the shared O-RAN resource is modeled using a schema mount operation.

Aspect 13: The method of any of Aspects 1 to 12, where the YANG-defined data model for the shared O-RAN resource includes a list that includes at least one of a shared resource identity, one or more tenant identities, and a configuration status of each tenant associated with the one or more tenant identities, respectively.

Aspect 14: A system for validating and committing a shared O-RU configuration via a shared O-RU Operator, comprising: a storage configured to store instructions; a processor configured to execute the instructions and cause the processor to: receive, by a shared Open Radio Access Network (O-RAN) resource operator, a first partitioning configuration from a first tenant operator, confirm, by the shared O-RAN resource operator, that the first partitioning configuration from the first tenant operator is conformant to a first out of band agreement, and after the confirming that the first partitioning configuration is conformant, commit the first partitioning configuration from the first tenant operator to a shared O-RAN resource configured by the shared O-RAN resource operator.

Aspect 15: The system of Aspect 14, wherein the processor is configured to execute the instructions and cause the processor to: receive a commit operation validation request along with the first partitioning configuration; and send a commit operation validation to the first tenant operator, the commit operation validation informing that the first partitioning configuration has been committed on the shared O-RAN resource.

Aspect 16: The system of any of Aspects 14 to 15, wherein the processor is configured to execute the instructions and cause the processor to: receive, by the shared O-RAN resource operator, a second partitioning configuration from a second tenant operator; confirm, by the shared O-RAN resource operator, that second partitioning configuration from the second tenant operator is conformant to a second out of band agreement; and after the confirming that the second partitioning configuration is conformant, commit the second partitioning configuration from the second tenant operator to the shared O-RAN resource, wherein the second tenant operator shares usage of the shared O-RAN resource with the first tenant operator.

Aspect 17: The system of any of Aspects 14 to 16, wherein the processor is configured to execute the instructions and cause the processor to: receive, from the second tenant operator, a subscription request to be notified of changes in a configuration data store affects the second tenant operator; and send, to the second tenant operator, a notification when a change that affects the second tenant operator has occurred in the configuration data store.

Aspect 18: The system of any of Aspects 14 to 17, wherein the first partitioning configuration requires radiating within a set spectrum while operating the shared O-RAN resource.

Aspect 19: The system of any of Aspects 14 to 18, wherein the shared O-RAN resource is at least a part of a base station.

Aspect 20: The system of any of Aspects 14 to 19, wherein the shared O-RAN resource operator implements a Network Configuration Protocol (NETCONF) server and the shared O-RAN resource operator implements a Network Configuration Protocol (NETCONF) server.

Aspect 21: The system of any of Aspects 14 to 20, wherein the processor is configured to execute the instructions and cause the processor to: provision a tenant account and a tenant NETCONF client at the shared O-RAN resource operator, wherein a configuration status is not specified for the tenant account at the NETCONF server; and after the provisioning and before the receive the first partitioning configuration, establish a NETCONF session.

Aspect 22: The system of any of Aspects 14 to 21, wherein the processor is configured to execute the instructions and cause the processor to: after the confirming, set the configuration status to pending.

Aspect 23: The system of any of Aspects 14 to 22, wherein the processor is configured to execute the instructions and cause the processor to: after the commit, set the configuration status to committed.

Aspect 24: The system of any of Aspects 14 to 23, wherein the first partitioning configuration is signaled using NETCONF-based transport of a Yet Another Next Generation-defined (YANG-defined) data model.

Aspect 25: The system of any of Aspects 14 to 24, wherein the first partitioning configuration of the shared O-RAN resource is modeled using a schema mount operation.

Aspect 26: The system of any of Aspects 14 to 25, wherein the YANG-defined data model for the shared O-RAN resource includes a list that includes at least one of a shared resource identity, one or more tenant identities, and a configuration status of each tenant associated with the one or more tenant identities, respectively.

Aspect 27: A non-transitory computer readable medium comprising instructions, the instructions, when executed by a computing system, cause the computing system to: receive, by a shared Open Radio Access Network (O-RAN) resource operator, a first partitioning configuration from a first tenant operator; confirm, by the shared O-RAN resource operator, that the first partitioning configuration from the first tenant operator is conformant to a first out of band agreement; and after the confirming that the first partitioning configuration is conformant, commit the first partitioning configuration from the first tenant operator to a shared O-RAN resource configured by the shared O-RAN resource operator.

Aspect 28: The non-transitory computer readable medium of Aspect 27, wherein the computer readable medium further comprises instructions that, when executed by the computing system, cause the computing system to: receive a commit operation validation request along with the first partitioning configuration; and send a commit operation validation to the first tenant operator, the commit operation validation informing that the first partitioning configuration has been committed on the shared O-RAN resource.

Aspect 29: The non-transitory computer readable medium of any of Aspects 27 to 28, wherein the computer readable medium further comprises instructions that, when executed by the computing system, cause the computing system to: receive, by the shared O-RAN resource operator, a second partitioning configuration from a second tenant operator; confirm, by the shared O-RAN resource operator, that second partitioning configuration from the second tenant operator is conformant to a second out of band agreement; and after the confirming that the second partitioning configuration is conformant, commit the second partitioning configuration from the second tenant operator to the shared O-RAN resource, wherein the second tenant operator shares usage of the shared O-RAN resource with the first tenant operator.

Aspect 30: The non-transitory computer readable medium of any of Aspects 27 to 29, wherein the computer readable medium further comprises instructions that, when executed by the computing system, cause the computing system to: receive, from the second tenant operator, a subscription request to be notified of changes in a configuration data store affects the second tenant operator; and send, to the second tenant operator, a notification when a change that affects the second tenant operator has occurred in the configuration data store.

Aspect 31: The non-transitory computer readable medium of any of Aspects 27 to 30, the first partitioning configuration requires radiating within a set spectrum while operating the shared O-RAN resource.

Aspect 32: The non-transitory computer readable medium of any of Aspects 27 to 31, the shared O-RAN resource is at least a part of a base station.

Aspect 33: The non-transitory computer readable medium of any of Aspects 27 to 32, the shared O-RAN resource operator implements a Network Configuration Protocol (NETCONF) server and the shared O-RAN resource operator implements a Network Configuration Protocol (NETCONF) server.

Aspect 34: The non-transitory computer readable medium of any of Aspects 27 to 33, wherein the computer readable medium further comprises instructions that, when executed by the computing system, cause the computing system to: provision a tenant account and a tenant NETCONF client at the shared O-RAN resource operator, wherein a configuration status is not specified for the tenant account at the NETCONF server; and after the provisioning and before the receive the first partitioning configuration, establish a NETCONF session.

Aspect 35: The non-transitory computer readable medium of any of Aspects 27 to 34, wherein the computer readable medium further comprises instructions that, when executed by the computing system, cause the computing system to:
after the confirming, set the configuration status to pending.

Aspect 36: The non-transitory computer readable medium of any of Aspects 27 to 35, wherein the computer readable medium further comprises instructions that, when executed by the computing system, cause the computing system to: after the commit, set the configuration status to committed.

Aspect 37: The non-transitory computer readable medium of any of Aspects 27 to 36, the first partitioning configuration is signaled using NETCONF-based transport of a Yet Another Next Generation-defined (YANG-defined) data model.

Aspect 38: The non-transitory computer readable medium of any of Aspects 27 to 37, the first partitioning configuration of the shared O-RAN resource is modeled using a schema mount operation.

Aspect 39: The non-transitory computer readable medium of any of Aspects 27 to 38, the YANG-defined data model for the shared O-RAN resource includes a list that includes at least one of a shared resource identity, one or more tenant identities, and a configuration status of each tenant associated with the one or more tenant identities, respectively.

What is claimed is:

1. A method for validating and committing a shared O-RU configuration, the method comprising:
   receiving, by a shared Open Radio Access Network (O-RAN) resource operator, a first partitioning configuration from a first tenant operator;
   receiving, by the shared O-RAN resource operator, a second partitioning configuration from a second tenant operator;
   confirming, by the shared O-RAN resource operator, that the first partitioning configuration from the first tenant operator is conformant to a first out of band agreement and that the second partitioning configuration from the second tenant operator is conformant to a second out of band agreement;
   distinguishing, by the shared O-RAN resource operator, a first access privilege level for the first tenant operator and a second access privilege level for the second tenant operator; and
   after the confirming that the first partitioning configuration and the second partitioning configuration is conformant, committing the first partitioning configuration from the first tenant operator and the second partitioning configuration from the second tenant operator to a shared O-RAN resource configured by the shared O-RAN resource operator that implements the first access privilege level for the first tenant operator and the second access privilege level for the second tenant operator based on a first tenant ID and a second tenant ID, respectively, wherein the committing is performed by the shared O-RAN resource operator first generating a composite configuration for the shared O-RAN resource including common and tenant-specific configurations, and subsequently using a separate config-status schema-node by the shared O-RAN resource operator to indicate to the first and second tenant operators when the first and second partitioning configurations have been committed to the shared O-RAN resource.

2. The method of claim 1, the method further comprising:
   receiving a commit operation validation request along with the first partitioning configuration; and
   sending a commit operation validation to the first tenant operator, the commit operation validation informing that the first partitioning configuration has been committed on the shared O-RAN resource operator.

3. The method of claim 1 further comprising:
   after the confirming that the second partitioning configuration is conformant, committing the second partitioning configuration from the second tenant operator to the shared O-RAN resource, wherein the second tenant operator shares usage of the shared O-RAN resource with the first tenant operator.

4. The method of claim 3, the method further comprising:
   receiving, from the second tenant operator, a subscription request to be notified of changes in a configuration data store affects the second tenant operator; and
   sending, to the second tenant operator, a notification when a change that affects the second tenant operator has occurred in the configuration data store.

5. The method of claim 1, wherein the first partitioning configuration requires radiating within a set spectrum while operating the shared O-RAN resource.

6. The method of claim 1 where the shared O-RAN resource is at least a part of a base station.

7. The method of claim 1, wherein the first partitioning configuration is signaled using NETCONF-based transport of a Yet Another Next Generation-defined (YANG-defined) data model.

8. The method of claim 7, further comprising:
   provisioning a tenant account and a tenant NETCONF client at the shared O-RAN resource operator, wherein a configuration status is not specified for the tenant account at a NETCONF server; and
   after the provisioning and before the receiving the first partitioning configuration, establishing a NETCONF session.

9. The method of claim 8, further comprising:
   after the confirming, setting the configuration status to pending.

10. The method of claim 8, further comprising:
    after the committing, setting the configuration status to committed.

11. The method of claim 7, wherein the shared O-RAN resource operator implements a Network Configuration Protocol (NETCONF) server, wherein the NETCONF server receives the first partitioning configuration from the first tenant operator and requires the first partitioning configuration to be validated by the shared O-RAN resource operator before the first partitioning configuration is committed to the shared O-RAN resource.

12. The method of claim 11, where the first partitioning configuration of the shared O-RAN resource is modeled using a schema mount operation.

13. The method of claim 11, where the YANG-defined data model for the shared O-RAN resource includes a list that includes at least one of a shared resource identity, one or more tenant identities, and a configuration status of each tenant associated with the one or more tenant identities, respectively.

14. A system for validating and committing a shared O-RU configuration, comprising:
    a storage configured to store instructions; and
    a processor configured to execute the instructions and cause the processor to:
    receive, by a shared Open Radio Access Network (O-RAN) resource operator, a first partitioning configuration from a first tenant operator;
    receive, by the shared O-RAN resource operator, a second partitioning configuration from a second tenant operator;

confirm, by the shared O-RAN resource operator, that the first partitioning configuration from the first tenant operator is conformant to a first out of band agreement and that the second partitioning configuration from the second tenant operator is conformant to a second out of band agreement;

distinguish, by the shared O-RAN resource operator, a first access privilege level for the first tenant operator and a second access privilege level for the second tenant operator; and after the confirming that the first partitioning configuration and the second partitioning configuration is conformant, commit the first partitioning configuration from the first tenant operator and the second partitioning configuration from the second tenant operator to a shared O-RAN resource configured by the shared O-RAN resource operator that implements the first access privilege level for the first tenant operator and the second access privilege level for the second tenant operator based on a first tenant ID and a second tenant ID, respectively, wherein the committing is performed by the shared O-RAN resource operator first generating a composite configuration for the shared O-RAN resource including common and tenant-specific configurations, and subsequently using a separate config-status schema-node by the shared O-RAN resource operator to indicate to the first and second tenant operators when the first and second partitioning configurations have been committed to the shared O-RAN resource.

15. The system of claim 14, wherein the processor is configured to execute the instructions and cause the processor to:

receive a commit operation validation request along with the first partitioning configuration; and send a commit operation validation to the first tenant operator, the commit operation validation informing that the first partitioning configuration has been committed on the shared O-RAN resource operator.

16. The system of claim 14, wherein the processor is configured to execute the instructions and cause the processor to:

after the confirming that the second partitioning configuration is conformant, commit the second partitioning configuration from the second tenant operator to the shared O-RAN resource, wherein the second tenant operator shares usage of the shared O-RAN resource with the first tenant operator.

17. The system of claim 16, wherein the processor is configured to execute the instructions and cause the processor to:

receive, from the second tenant operator, a subscription request to be notified of changes in a configuration data store affects the second tenant operator; and send, to the second tenant operator, a notification when a change that affects the second tenant operator has occurred in the configuration data store.

18. The system of claim 14, wherein the first partitioning configuration requires radiating within a set spectrum while operating the shared O-RAN resource.

19. A non-transitory computer readable medium comprising instructions, the instructions, when executed by a computing system, cause the computing system to:

receive, by a shared Open Radio Access Network (O-RAN) resource operator, a first partitioning configuration from a first tenant operator;

receive, by the shared O-RAN resource operator, a second partitioning configuration from a second tenant operator;

confirm, by the shared O-RAN resource operator, that the first partitioning configuration from the first tenant operator is conformant to a first out of band agreement and that the second partitioning configuration from the second tenant operator is conformant to a second out of band agreement;

distinguishing, by the shared O-RAN resource operator, a first access privilege level for the first tenant operator and a second access privilege level for the second tenant operator; and after the confirming that the first partitioning configuration and the second partitioning configuration is conformant, commit the first partitioning configuration from the first tenant operator and the second partitioning configuration from the second tenant operator to a shared O-RAN resource configured by the shared O-RAN resource operator that implements the first access privilege level for the first tenant operator and the second access privilege level for the second tenant operator based on a first tenant ID and a second tenant ID, respectively, wherein the committing is performed by the shared O-RAN resource operator first generating a composite configuration for the shared O-RAN resource including common and tenant-specific configurations, and subsequently using a separate config-status schema-node by the shared O-RAN resource operator to indicate to the first and second tenant operators when the first and second partitioning configurations have been committed to the shared O-RAN resource.

* * * * *